United States Patent
Bodurka et al.

(10) Patent No.: US 10,563,456 B2
(45) Date of Patent: Feb. 18, 2020

(54) LOCATION AWARE BARRIER OPERATION

(71) Applicant: The Chamberlain Group, Inc., Oak Brook, IL (US)

(72) Inventors: Alex Bodurka, Chicago, IL (US); Casparus Cate, Chicago, IL (US); Mark L. Karasek, Lombard, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 197 days.

(21) Appl. No.: 15/707,289

(22) Filed: Sep. 18, 2017

(65) Prior Publication Data
US 2018/0080280 A1 Mar. 22, 2018

Related U.S. Application Data

(60) Provisional application No. 62/396,589, filed on Sep. 19, 2016.

(51) Int. Cl.
*E06B 9/68* (2006.01)

(52) U.S. Cl.
CPC .......... *E06B 9/68* (2013.01); *E05Y 2900/106* (2013.01); *E06B 2009/6809* (2013.01); *E06B 2009/6845* (2013.01)

(58) Field of Classification Search
CPC .............. E06B 9/68; E06B 2009/6809; E06B 2009/6845; E05Y 2900/106
See application file for complete search history.

(56) References Cited

U.S. PATENT DOCUMENTS

| 5,168,267 | A   | * | 12/1992 | Trickle  | B65G 69/003 14/71.1 |
| 6,271,765 | B1  |   | 8/2001  | King     |                     |
| 6,329,931 | B1  | * | 12/2001 | Gunton   | B65G 69/003 340/686.1 |
| 6,563,430 | B1  |   | 5/2003  | Kemink   |                     |
| 7,256,703 | B2  |   | 8/2007  | Duvernell|                     |
| 7,289,014 | B2  |   | 10/2007 | Mullet   |                     |
| 8,497,761 | B2  | * | 7/2013  | McNeill  | B65G 69/005 340/5.7 |
| 8,761,712 | B1  |   | 6/2014  | Howard   |                     |

(Continued)

FOREIGN PATENT DOCUMENTS

WO    2018053416    3/2018

OTHER PUBLICATIONS

PCT Patent Applicaiton No. PCT/US2017/052042; International Search Report and Written Opinion dated Dec. 31, 2017.

*Primary Examiner* — Katherine W Mitchell
*Assistant Examiner* — Abe Massad
(74) *Attorney, Agent, or Firm* — Fitch Even Tabin & Flannery LLP

(57) ABSTRACT

An apparatus controls the operation of multiple barriers at a common location. The apparatus includes a controller that determines which particular barrier operator among a group of several barrier operators should execute functionality based on certain operating conditions (e.g., location, speed, direction, orientation, etc.) relative to a controller or another component of the apparatus. In response to a user operating an interface in a manner intended to effect a barrier operator function, the apparatus causes the particular barrier operator to execute the function without affecting the other barrier operators among the group.

22 Claims, 15 Drawing Sheets

(56) References Cited

U.S. PATENT DOCUMENTS

| 9,396,598 B2 | 7/2016 | Daniel-Wayman |
| 2013/0117078 A1* | 5/2013 | Weik, III ............... G06Q 10/00 705/13 |
| 2014/0075842 A1 | 3/2014 | McNeill |
| 2015/0148983 A1 | 5/2015 | Fitzgibbon |
| 2016/0259028 A1* | 9/2016 | High ........................ E01H 5/12 |

* cited by examiner

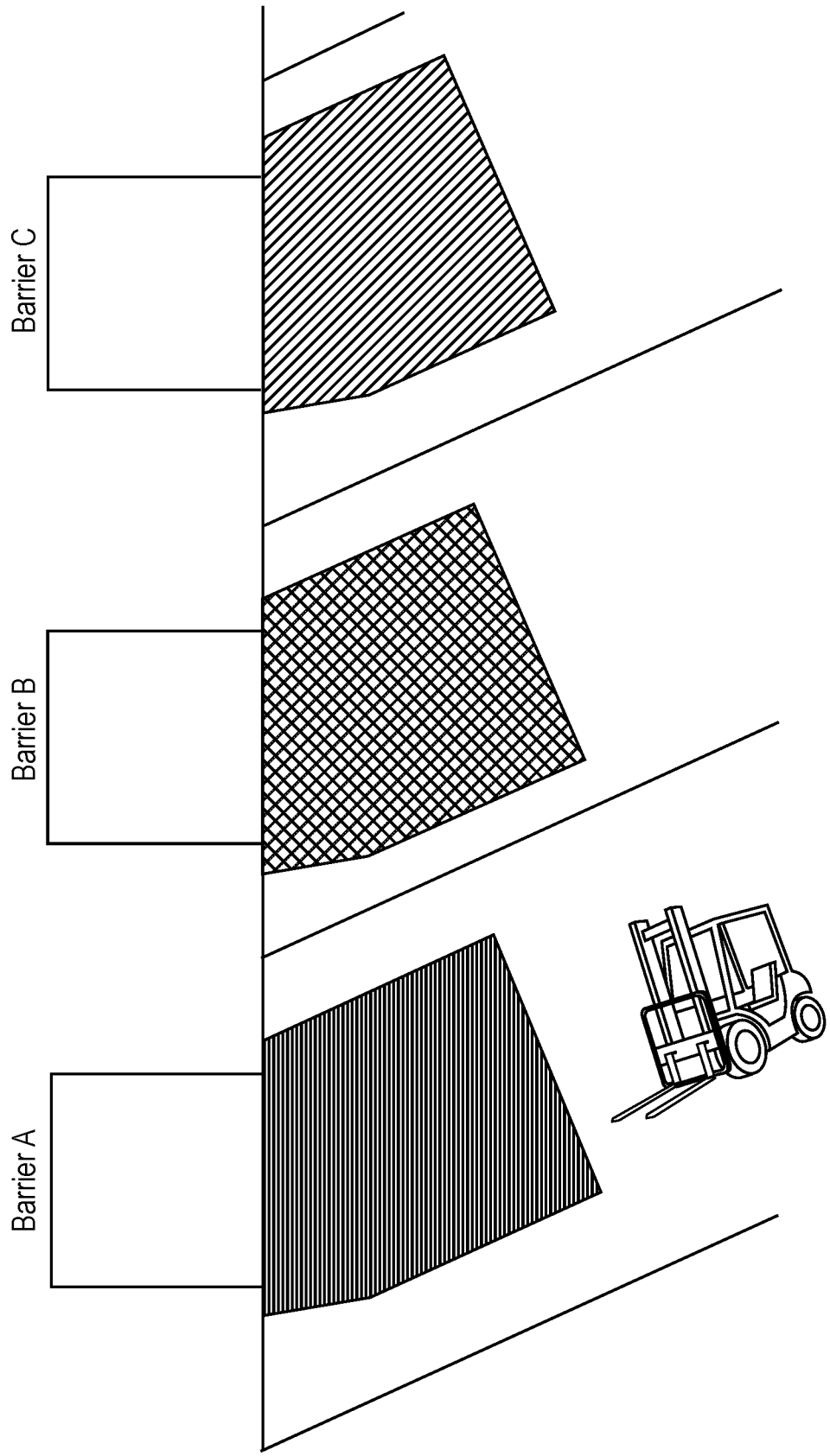

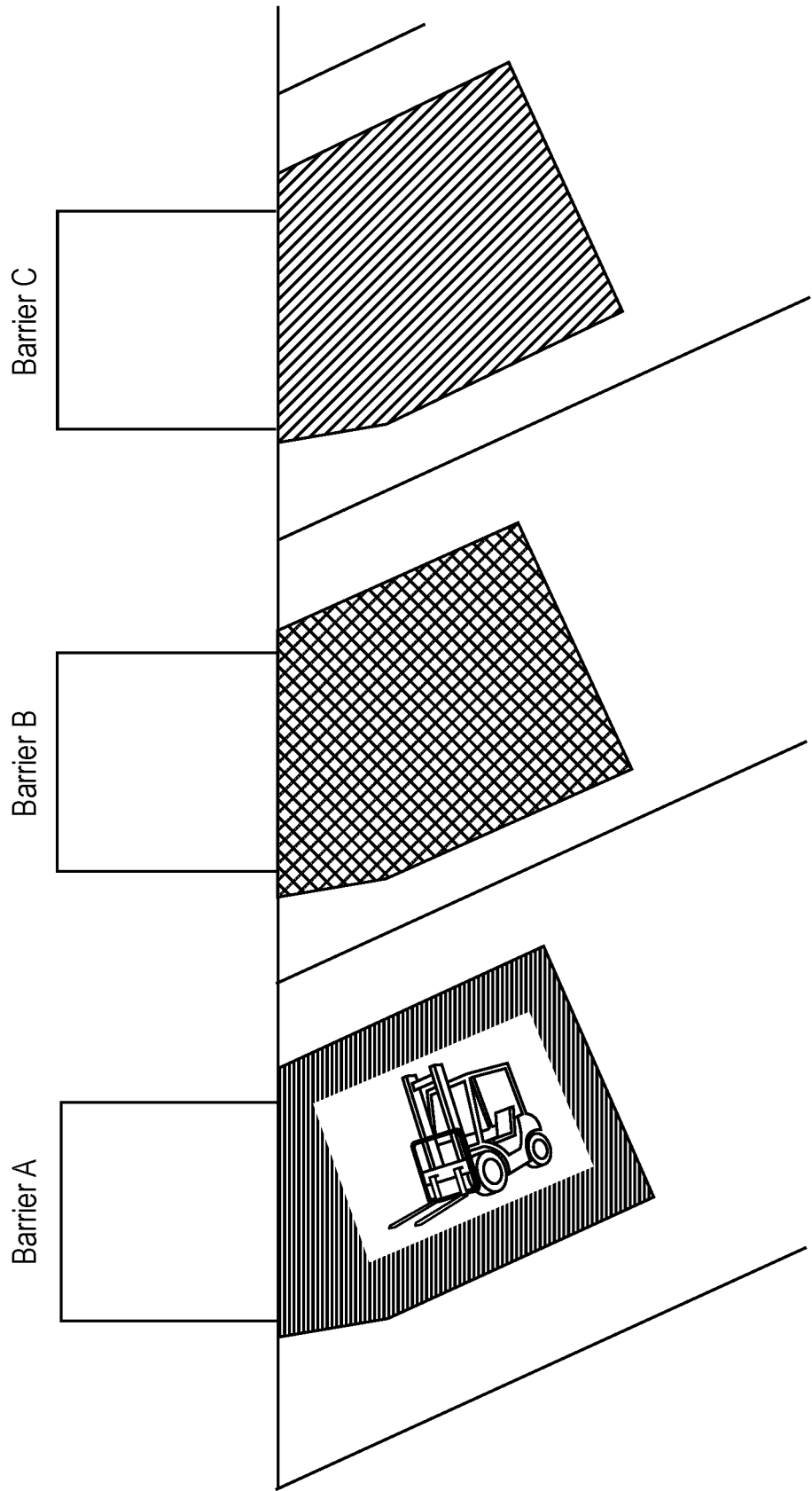

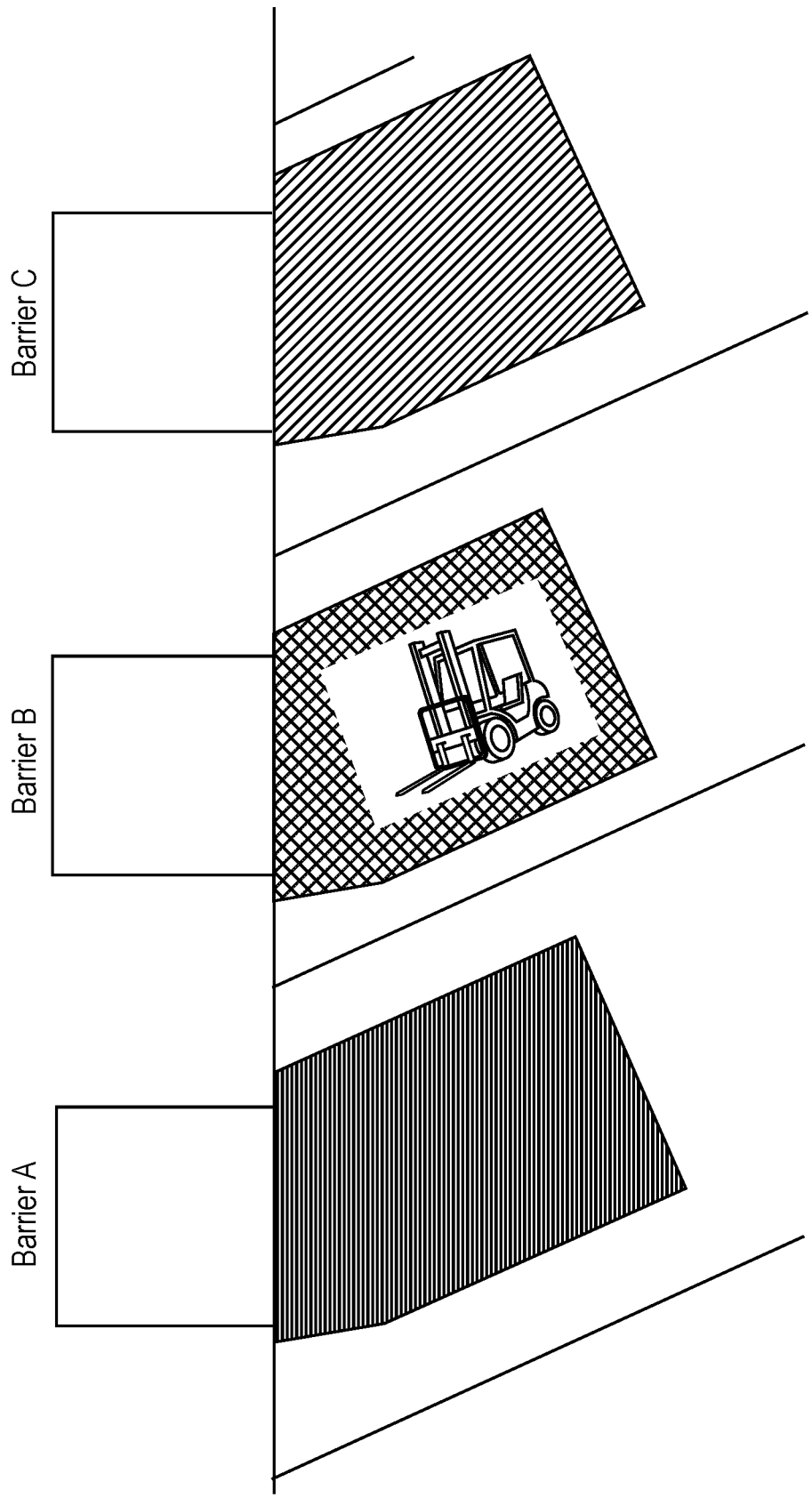

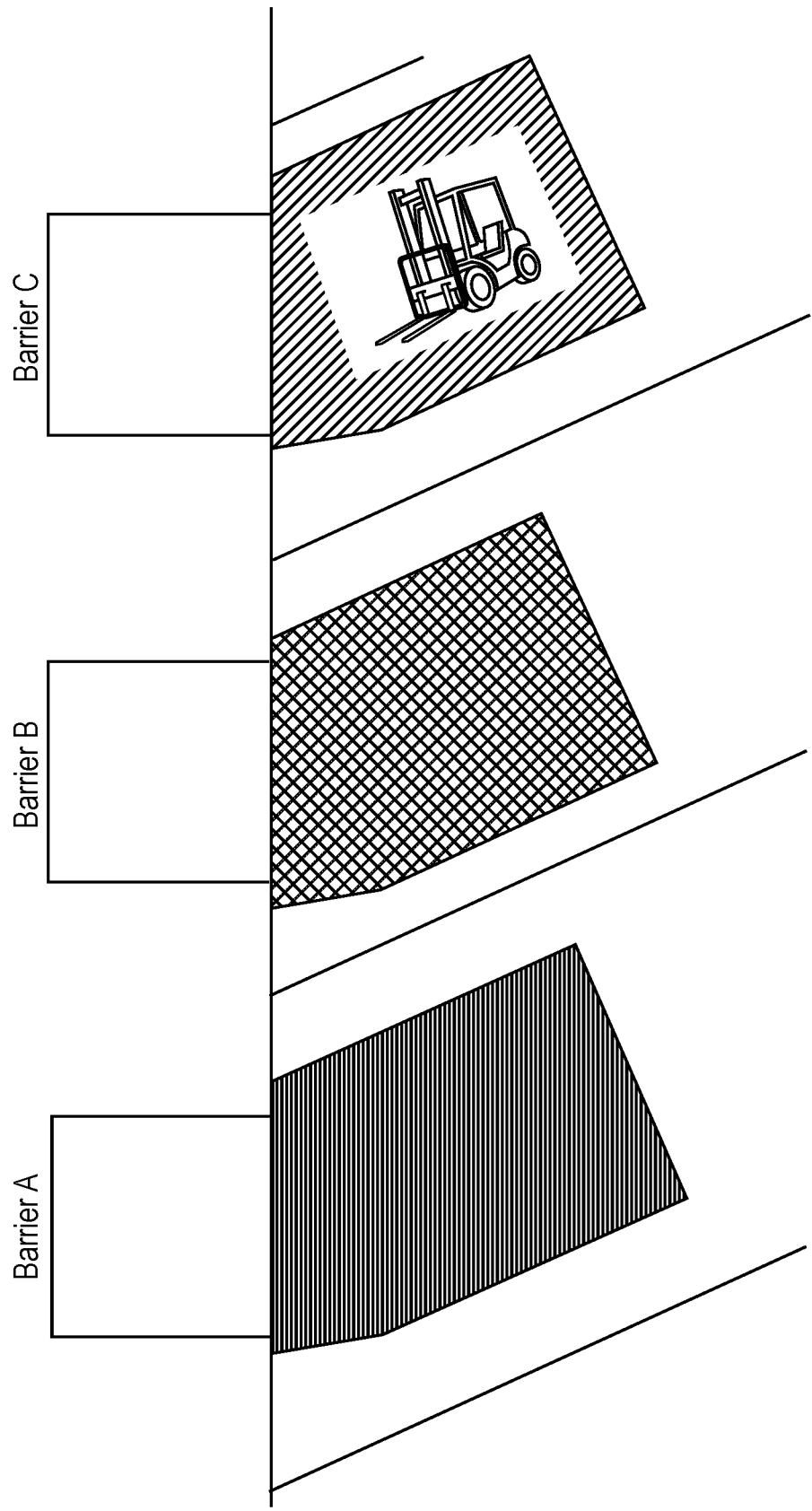

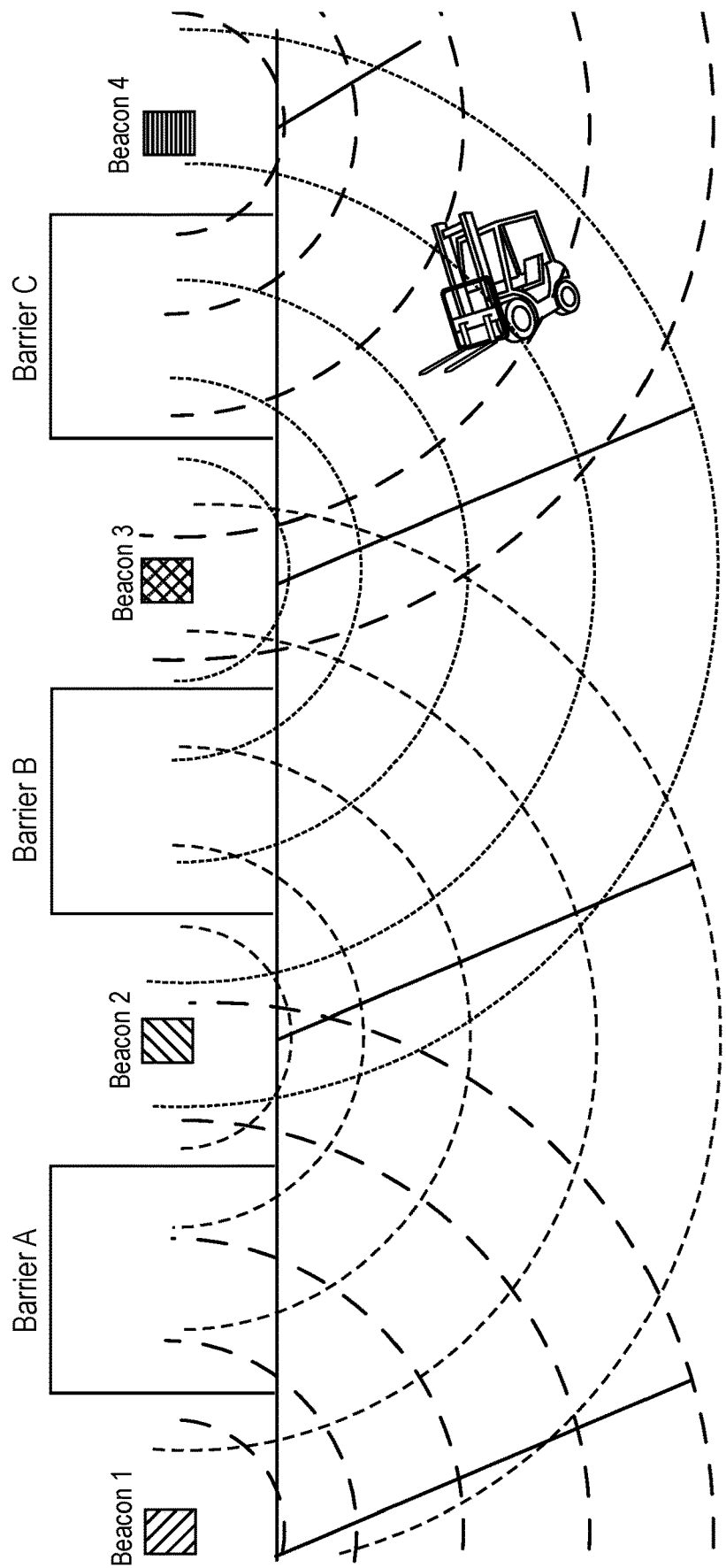

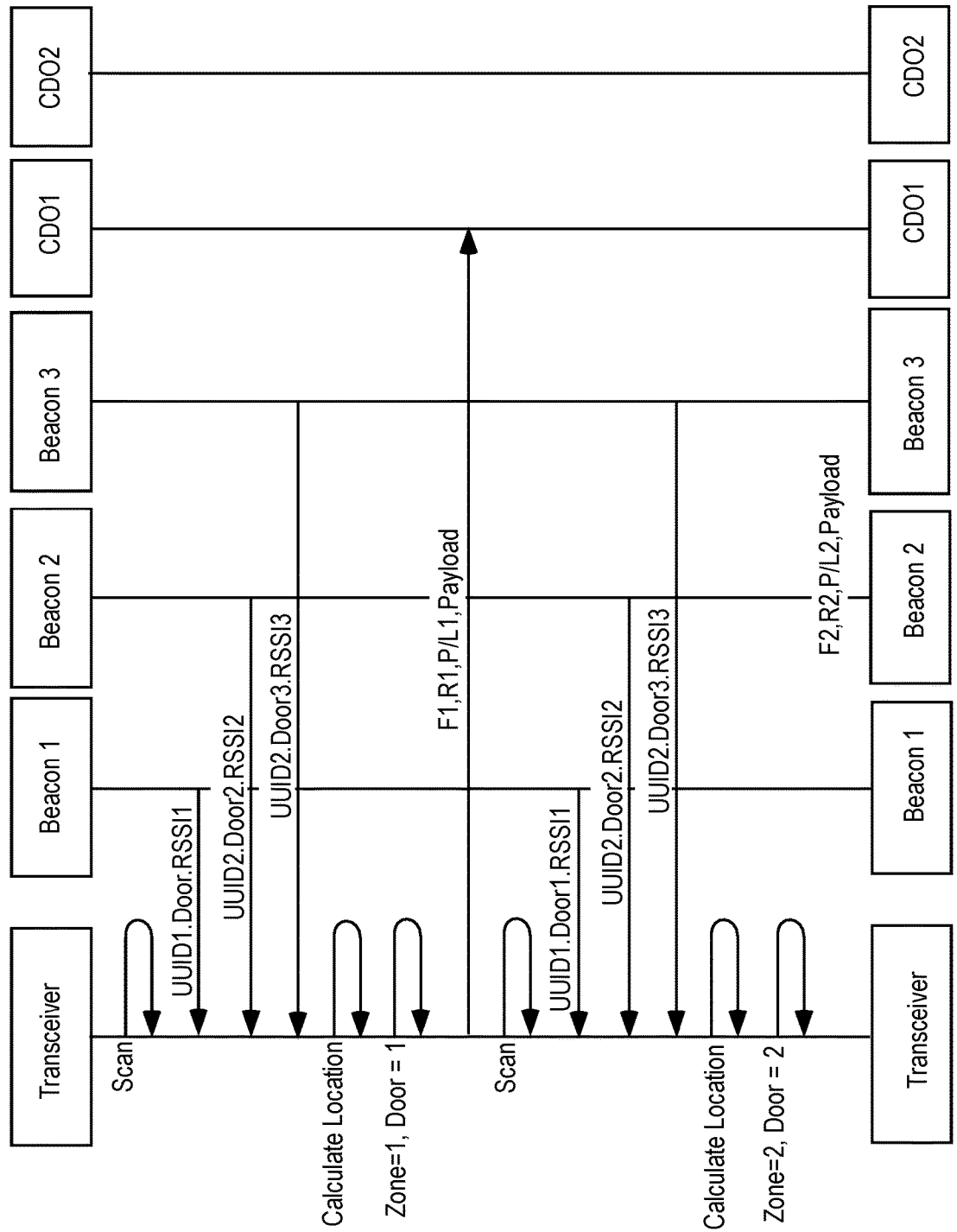

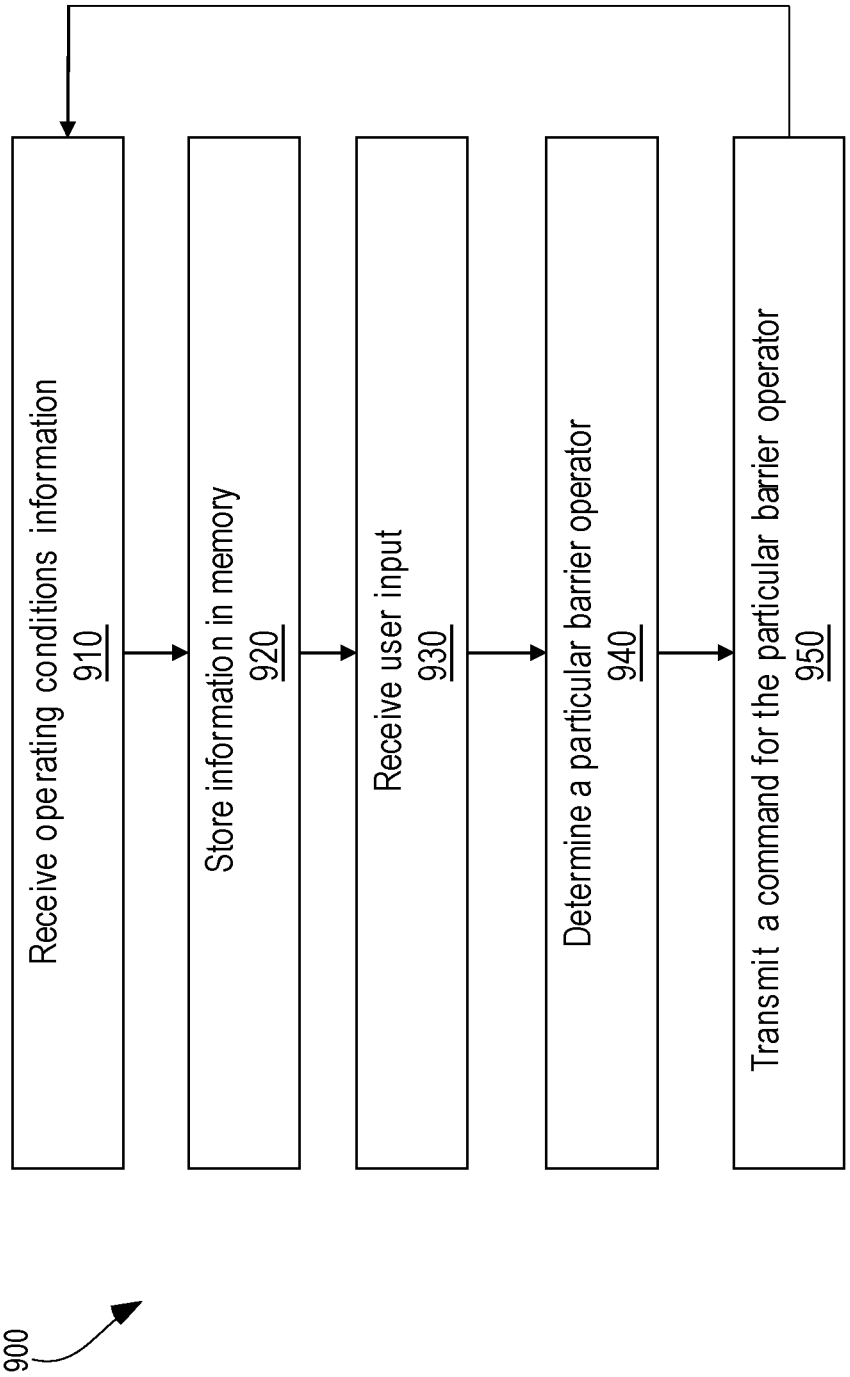

LOCATION AWARE BARRIER OPERATION

CROSS-REFERENCE TO RELATED APPLICATION

This application claims the benefit of U.S. Provisional Patent Application No. 62/396,589, filed Sep. 19, 2016, which is incorporated by reference in its entirety herein.

TECHNICAL FIELD

This application relates generally to barrier operators. More particularly, this application relates to controllers that operate barrier operators among a group of barrier operators based on operating conditions relating to the controller.

BACKGROUND

Barrier operators of various kinds are used to control the opening and closing of gates, doors, or barriers that permit access to enclosed spaces. Examples barrier operators include gate operators, rolling shutter operators, garage door operators, and the like. In one example, garage door operators are mounted within a garage to automate the process of opening and closing a garage door.

Some facilities may have multiple access points, each of which utilizes its own barrier and barrier operator. Examples of such facilities include warehouses, shipping facilities, assembly plants, loading docks, and the like. Other examples may also include home garages that utilize two or more doors that control access to various car ports or garage entry points. In such facilities, each of the barriers may be operated by its own separate barrier operator (e.g., a garage door operator).

In multi-barrier facilities, it is efficient to operate individual barriers separately from one another, one at a time. That is, when access to a single entry point is desired, it is efficient to open only the barrier that provides access to that entry point. Opening all the barriers together can waste energy and present security issues to the facility.

SUMMARY

The present disclosure describes devices and techniques for controlling barrier operators at facilities that employ multiple barrier operators at a plurality of entry points. The devices and techniques determine which of the barrier operators should execute functionality (e.g., opening, closing, or halting the barrier, turning on a light, generating a sound, etc.) based at least in part on current operating conditions pertaining to a control device. The current operating conditions can include information relating to the location, orientation, speed, and/or direction of the controller or another object that is effecting the transmissions of commands intended to effect the functionality of barrier operators. For instance, when a controller transmits a signal intended to effect the operation of a barrier operator, the presently described technology may make a determination based on the location and direction of the controller which particular barrier operator among a group of barrier operators should respond to the command, and thereafter effect operation of that particular barrier operator without effecting the other barrier operators in the group.

In one particular example, an apparatus for controlling multiple movable barriers in a common area or facility includes a controller, or a control apparatus. The controller includes a memory device that can store information that corresponds to a plurality of movable barrier operators. The controller also includes a receiver that receives information about the location of the controller and/or the receiver relative to the barrier operators. The controller also includes a user interface (e.g., a touch screen interface, button(s), knob(s), switch(es), or collections thereof), and a transmitter. The controller also includes a processing device that communicates with the other components of the controller. The processor makes a determination of which of the plurality of movable barrier operators should be operated based on the location of the controller and/or receiver, the direction of motion of the controller and/or receiver, the orientation of the controller and/or receiver, combinations thereof, and/or other factors. When a user interacts with the user interface (e.g., by pressing a button, activating a function, etc.), the controller, via the transmitter, communicates a signal or command. The signal is selected by the processor to be specific to a particular barrier operator (or group of barrier operators) among the plurality of barrier operators, such that the particular barrier operators (or group of barrier operators) execute a function in response to the command, whereas the other barrier operators do not respond to the command. As the controller moves, changes direction, orientation, speed, and/or location, the processor determines which of the barrier operators should be operated based on present conditions. In this way, the controller operates to effect the functionality of only the barrier operator(s) that are appropriate for the controller under the present operating conditions.

BRIEF DESCRIPTION OF THE DRAWINGS

FIGS. 5A-D present different scenarios demonstrating actions taken by a multi-barrier control system as they relate to operating conditions of a fork-lift at a multi-barrier facility, in accordance with aspects of this application.

FIGS. 6A-D present different scenarios demonstrating actions taken by a triangulation-based multi-barrier control system as they relate to operating conditions of a fork-lift at a multi-barrier facility, in accordance with aspects of this application.

FIG. 7 is a diagram depicting an example message sequence for determining a particular barrier operator to perform a function based the detected location of an object in accordance with aspects described in this application.

FIG. 9 is a flow diagram of an example method for operating a movable barrier among multiple movable barriers in a facility, in accordance with aspects described in this application.

DETAILED DESCRIPTION

Figure 1:
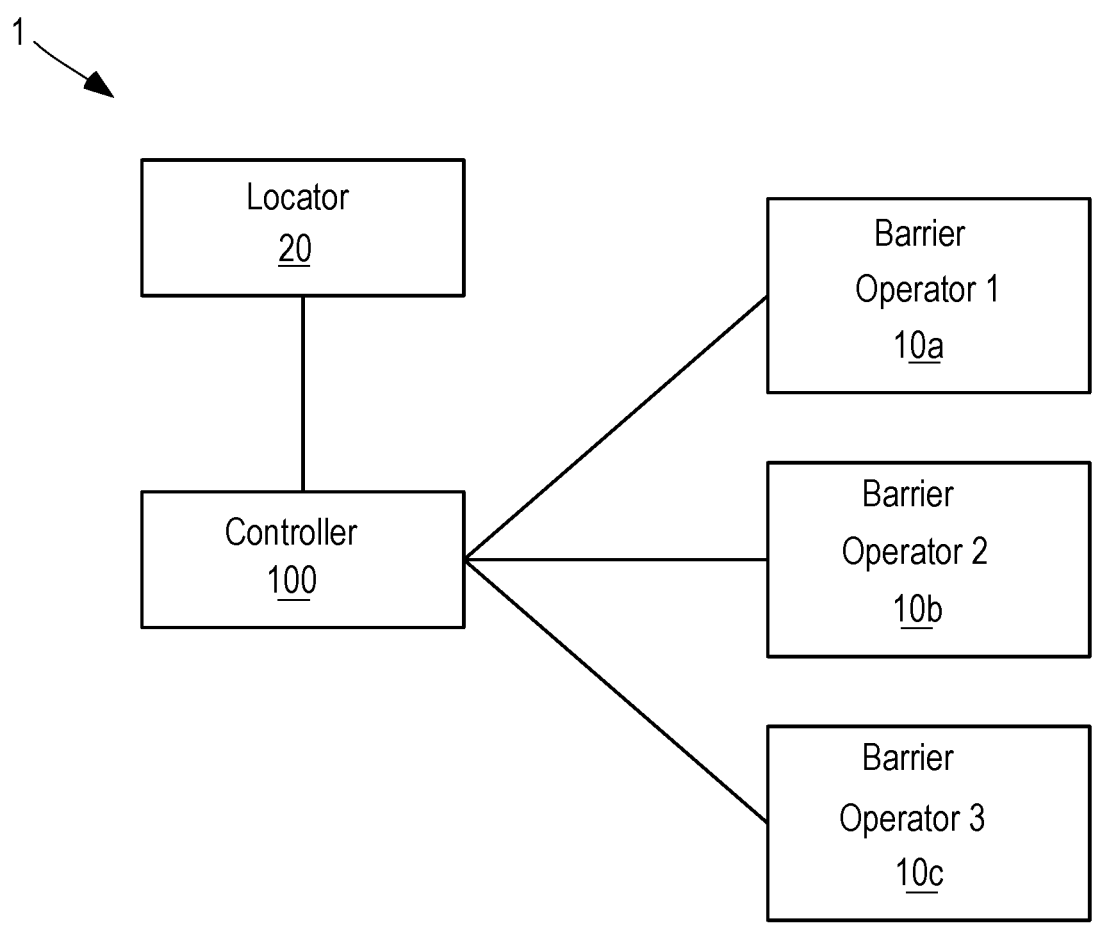
FIG. 1 is a schematic diagram of an example of a barrier control system at a multi-barrier facility described in this application.

This application describes systems and equipment (and techniques for operating the systems and equipment) that controls the operation of a particular barrier operator in a facility that includes multiple barrier operators. The systems and equipment include a controller or control unit (e.g., a remote controller) that can move throughout the facility. In this way, users carrying the controller throughout the facility can control the operation of a particular barrier operator without having to use different controllers (e.g., barrier operator specific controllers).

The equipment uses a processor (or processors) to make a determination as to which particular barrier operator is most suitable for operation based on current operating conditions. Additionally and/or alternatively, the processor can make a determination as to which particular barrier operator is most likely to be the object of the user's intent when operating the controller. The current conditions upon which the determination is based can include, for instance, the location the equipment (e.g., the controller, components of the controller, components that communicate directly or indirectly with the controller, etc.), the orientation of the equipment, the direction of motion of the equipment, the speed of the equipment, the acceleration of the equipment, the length of time the equipment has been in a certain region, the time of day, identification information associated with the equipment, among others. The determination may also be based on other information, such as the nature of a signal transmitted or received by or among the equipment or the intended function intended to be operated by the barrier operator. In this way, the users can effect a desired functionality without having to personally configure or adjust a controller or other equipment to associate it with a particular barrier operator.

In certain embodiments, the described controller is aware of certain operating conditions, either by monitoring these conditions internally (e.g., through components of the controller) or by receiving information from remote sources that monitor the conditions. Based on the conditions, the controller determines a particular barrier operator to communicate with. This determination can be done by consulting a look up table, for instance, stored in a memory associated with the controller. The determination can involve obtaining a unique feature such as a code, an ID tag, or another identifier that is associated with a particular barrier operator. The controller then transmits a signal that includes the unique feature. The signal is received by each of the barrier operators (or a control unit that in turn operates each of the barrier operators). The barrier operators are configured to respond to the signal only if the signal's unique feature is associated with that particular barrier operator. Thus, it is determined that a particular barrier operator is the object of a particular signal, the controller sends out a unique signal that will effect an operation from only that particular barrier operator.

Because the presently disclosed technology involves making a determination as to which particular barrier operator should be the recipient of a command based on operating conditions and then sending a signal with a feature unique to that operator, the determination can be based on a number of different factors. For example, the determination can be based on the location of the controller and/or components of the controller, but it can also be determined based on other factors such as direction, orientation, speed, acceleration, etc. This can be particularly useful where a controller is in a location that may correspond to multiple different barrier operators (e.g., on a border between two zones in a facility or in a region that is overlapped by multiple zones). That is, the present disclosure allows for educated and more accurate determinations as to which particular barrier operator is most suitable for responding to a command.

As used herein, the phrase "particular barrier operator" refers to a barrier operator, or a subset of barrier operators, among multiple barrier operators in a facility, that is particularly identified to perform a certain task. The term "particular barrier operator" may refer to a single barrier operator, or it may refer to two or more barrier operators depending on the circumstances. For example, in some situations, a single entryway or access point may be controlled by two, three, or even more barriers, each barrier operated by separate operators. In this way, one barrier may block or close access to only a portion (e.g., one half, one third, etc.) of the access point. Accordingly, in these situations, it may be determined that only one of the barrier operators constitutes the "particular barrier operator." However, in other situations, for instance, where the controller is associated with a large vehicle, it may be determined that more than one barrier operators constitutes the "particular barrier operator." Further, in some embodiments, it may be appropriate to associate a single controller with multiple vehicles. For example, one controller may be associated with two vehicles, each of which intends to operate at adjacent bays (or opposing bays) in a facility. In such a situation, the "particular barrier operator" may include the barrier operator corresponding to the access point of the vehicle with the controller, as well as the barrier operator corresponding to the adjacent (or opposite) bay.

FIG. 1 shows an example of a system or apparatus 1 designed for controlling multiple movable barriers 10a, 10b, 10c, in a common area or facility. The apparatus 1 includes a controller 100, or control apparatus, that communicates with multiple barrier operators 10n, and a locator 20. The controller 100 can be a remote controller, such as a garage door opener, an electronic device, such as a mobile phone or tablet computer operating software with an interface, or another device. In some examples, the controller 100 is simply a button or other interface device that executes functionality when pressed or input by a user.

The locator 20 obtains operating conditions that pertain to the controller 100 and communicates that information to the controller 100. The locator 20 can be external to the controller or located within a housing of the controller 100. In some examples, the locator 20 can include some components that are located remote from the controller 100 and other components that are located within the controller. In some examples, the locator 20 is a global positioning system (GPS) device that obtains coordinates of the controller 100. In other examples, the locator 20 includes one or more beacons or positioning transmitting devices placed around a facility that communicate with, or otherwise obtains information from, the controller 100. For example, the locator 20 can include a collection of radio signal beacons that transmit signals used to triangulate a position of the controller 100. The locator 20 may communicate information about the location to the controller 100, or the controller 100 may make the determination itself based on the signals received.

The controller communicates with a plurality of barrier operators 10n, each of which are configured to operate a movable barrier about an entryway or access point to a facility. The barrier operators 10n can be configured to move the barrier between an open position, where the entry way is fully accessible from outside the facility, to a closed position, where access through the entryway is obstructed, and stopping at or moving the barrier to positions in between the open and closed position. In some examples, one barrier operator 10n can be configured to operate two or more different movable barriers. In this way, the barrier operator can be configured to open and close multiple barriers simultaneously, or only one at a time based on the receipt of specific commands.

For ease of reference, the present application refers to the objects controlled by the apparatus 1 as barrier operators, which are configured to control operation of a movable barrier. However, it should be understood that the apparatus 1 and/or the controller 100 can be configured to control a number of different devices that may be located around a barrier or facility entrance, or even elsewhere in the facility. For example, the apparatus 1 and/or controller can be configured to control devices that include movable barriers, photoeyes, safety edges, lights, lighting controls and lighting systems, dock levelers, trailer locks, controlled power outlets, cameras, edge guards, dock seals, dock bumpers, microwave sensors, area optical detectors, loop detectors, security systems, sound generators (e.g., warning signals, PA announcements, music, etc.), visual displays (e.g., blinking lights, digital signage), communication systems (e.g., WiFi, Bluetooth, RFID, infrared, wired systems, or the like), and air compressors to name some examples. It should be understood that each reference to a barrier operator throughout this application could be replaced with a reference to any of these devices unless the context clearly indicates otherwise. In some examples, the barrier operator 10 referred to may be a single device capable of performing two or more, or even all of these functions.

Figure 2:
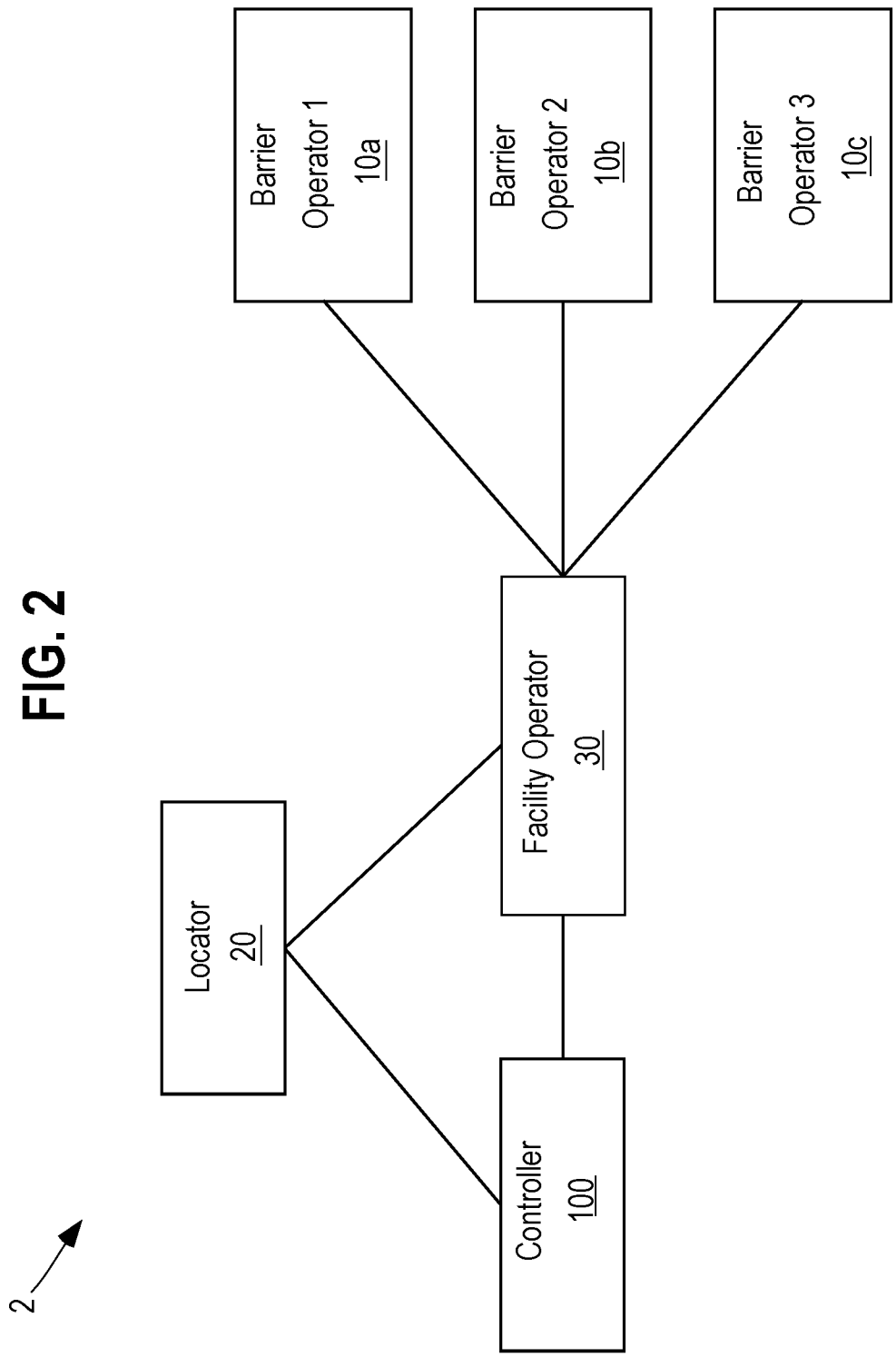
FIG. 2 is a schematic diagram of another example of a barrier control system at a multi-barrier facility described in this application.

In FIG. 1, the controller 100 communicates directly with a plurality of barrier operators 10, but in some embodiments, the controller 100 may communicate indirectly with the barrier operators 10. For example, FIG. 2 shows a diagram of an apparatus 1 at a facility, where the controller 100 communicates with a facility operator 30, which in turn communicates with the barrier operators 10. The facility operator can be a network hub, or it may be a master control device configured to send commands to individual ones of the multiple barrier operators. In some examples, the facility operator 30 will also communicate with the locator 20 to gather information about the operating conditions of the controller 100. For instance, the facility operator 30 may gather information about the location, direction, speed, and orientation of the controller 100 from the locator, and then transmit that information to the controller 100. The facility operator 30 may alleviate the need for the controller 100 to communicate directly with the locator 20, allowing such indirect communication, but in some embodiments, the controller 100 may still communicate with a locator, or components thereof, while also maintaining communication with the facility operator 30. The facility locator 30 may comprise a variety of components and devices spread throughout the facility.

Figure 3:
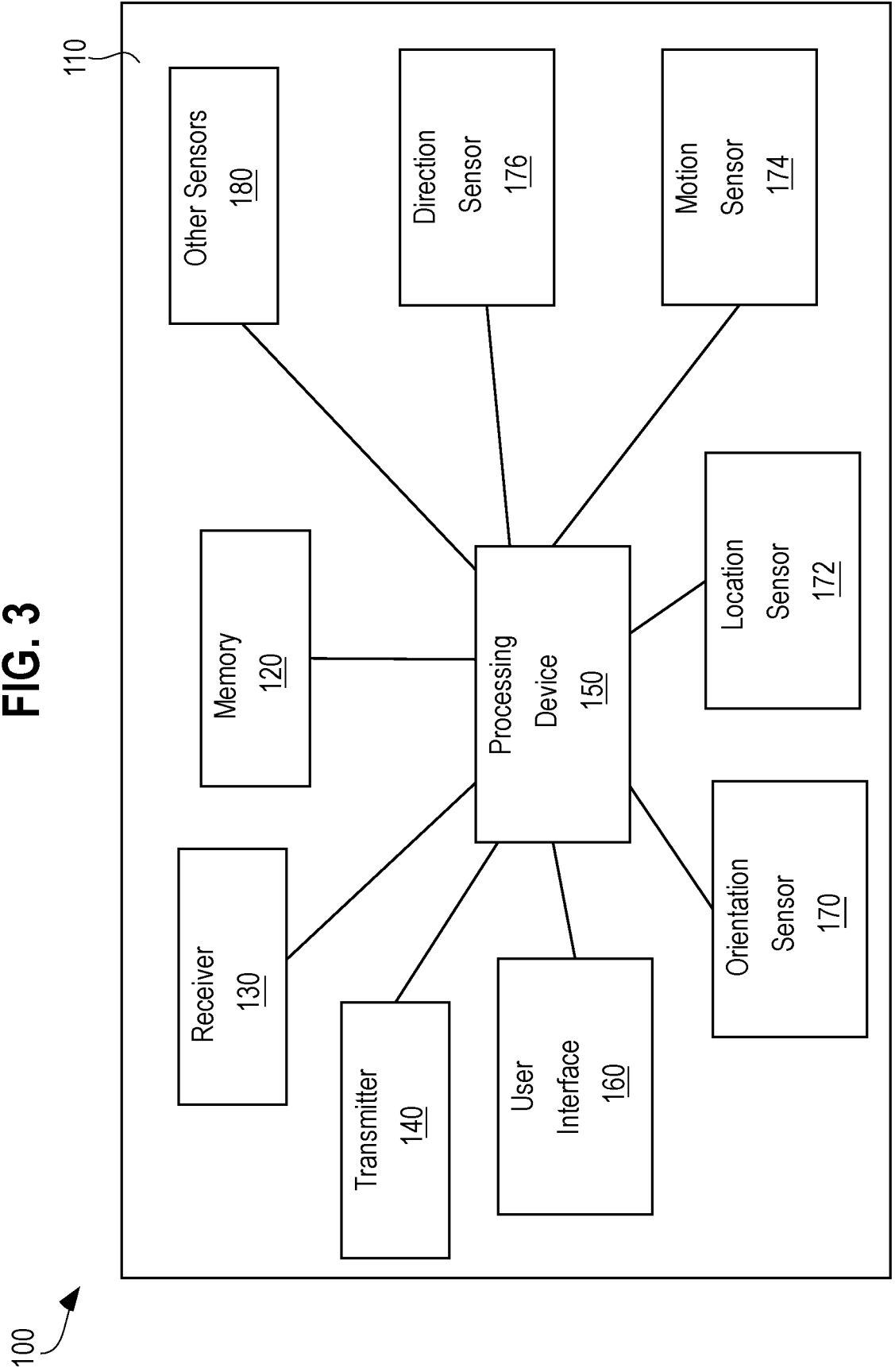
FIG. 3 is a schematic diagram showing the components of an example of a controller for a multi-barrier control system described in this application.

FIG. 3 shows a schematic diagram of an example of a controller 100 used in connection with some embodiments described herein. In FIG. 3, the controller 100 includes a housing 110 and various devices and components located within the housing 110. It should be understood that this is one example, and in other examples, some of the components of the controller 100 may be located external to the housing 110.

As seen in FIG. 3, the controller 100 includes a memory device 120. The memory device 120 can be a data memory that stores information electronically, such as a hard drive or other digital memory circuitry. The memory 120 can thus store information corresponding to a plurality of movable barrier operators. For example, the memory 120 can store a look-up table or other data file that corresponds individual barrier operators among the barrier operators in the facility with certain identification information. The identification can include identification codes, names, numbers, titles, or the like. The memory device 120 can be a component of the controller 100 (e.g., located within the housing 110 of the controller 100) or it can be located in a location separate from the controller 100 and any corresponding housing 110. For instance, the memory device 120 may correspond to a remote computing device accessible via a network or another cloud or network based storage device. In such an example, the controller 100 may include a communication device adapted to communicate with the remote memory device 120 to access the information maintained therein.

The controller 100 of FIG. 3 also includes a receiver 130 configured to receive signals from a remote transmitting device. In some examples, the receiver 130 will be a part of a transceiver device capable of transmitting as well as receiving signals. The receiver 130 receives information that is used to assist in the determination of which particular barrier operator to use. In some embodiments, the receiver 130 is configured to receive information indicative of the location of the receiver 130, the location of the controller 100, or the location of another component that is a part of, or in communication with, the controller 100 (e.g., a tracking device). The information that the receiver 130 receives can indicate the location of the receiver 130 relative to the multiple movable barrier operators at the facility. The receiver can also receive other information including information regarding the direction, orientation, speed, and acceleration of the receiver 130 or controller 100, for instance.

In some examples, the receiver 130 will receive the information from a remote source. For example, the receiver may communicate with a GPS-based system to obtain coordinates as to the receiver 130 location. Additionally, and/or alternatively, the receiver 130 may communicate with sensors, cameras, and other equipment to receive the information regarding current operating conditions of the controller 100. The receiver 130 may also communicate with a network that is in communication with multiple devices that communicate to triangulate a location of the receiver 130 (or another component of the controller 100). In some examples the receiver 130 will receive information locally from other components that are a part of the controller or may generate the information itself. For example, the receiver 130 may include or communicate with an accelerometer, a compass, or other equipment that makes determinations as to the position, orientation, speed, and direction of the receiver 130 and/or controller 100. Various types of such devices are known in the art. The receiver 130 may also include sensors (e.g., tracking sensors) that detect a location and/or processors that determine a location based on other information that is available.

The controller 100 of FIG. 3 has a transmitter device 140 that sends signals from the controller. The transmitter device 140 can also be a component of a transceiver, which transceiver may include the receiver 130 described above. The transmitter 140 may be able to transmit signals to movable barrier operators, to a facility operator, to a network, or to other remote devices. In some examples, the signals transmitted from the transmitter effect the operation of one or more barrier operators in the facility.

The controller 100 of FIG. 3 also includes a user interface 160 that receives a user input. The user interface 160 can include an electrically operated interface, such as a touch screen or other touch sensitive operators. The interface 160 can also include mechanically operated operators such as push buttons, levers, knobs, dials, switches, tuners, and the like. The user interface 160 may also include sound input devices, such as a microphone. In some examples, the user interface 160 will include combinations of the aforementioned devices.

Via the user interface 160, the controller 100 can receive a user input. The user input can be in the form of a button press, a typed in command, a selected icon, an audible command, or the like. The user input can be configured to execute one or more of a number of functions. For example, depending on the interface 160 and the type of input provided, the user input can be configured to operate functionality of a barrier operator. That functionality can include, for instance, opening a barrier, closing a barrier, stopping movement of a barrier, operating multiple barriers, turning a light on or off, generating a sound (e.g., a warning sound or operating a PA system), communicating a signal, operating a dock leveler, operating a trailer lock, operating a lighting control, operating a power outlet, operating various equipment such as a camera, an air compressor, or selecting a particular door or barrier to operate.

The controller 100 may also be configured to receive a user input by way of a gesture or other action that does not involve direct interaction with a component on the user interface 160. For instance, the user may be able to enter an input by way of gesturing or orienting the controller in a particular manner. The user also may be able to enter an input by shaking the controller, tilting the controller, moving the controller 100 from left to right (or vice versa), speaking into the controller 100, or other techniques. In this way, the user interface 160 may include or operate in connection with tilt sensors, accelerometers, microphones, or the like, each of which may be components of the controller 100. In some examples, each different technique for making a user input can be configured to generate a different function or operation by the select barrier operator.

The controller 100 and/or user interface 160 may also be configured to send different types of signals or commands based on the operating conditions present when a user input is received. For instance, the controller 100 can be configured to send an "open" command when a button is pressed while the user interface is facing upwards, and a "light on/off" command when the button is pressed while being held sideways. This allows a single button to take on multiple functions without adding clutter and other buttons to the user interface 160.

The controller 100 may also include, or be in communication with a variety of sensors or detectors. For example, the controller 100 of FIG. 3 is shown having an orientation sensor 170, a location sensor 172, a motion sensor 174, a direction sensor 176, and other sensors 180.

The orientation sensor 170 detects the orientation or direction that the controller is facing. For example, the orientation sensor 170 can be, or may include, an accelerometer, tilt sensor, or other similar device. Via the orientation sensor, the apparatus 1 may be able to determine if a controller is facing a particular barrier, for instance.

The location sensor 172, or position sensor, detects and monitors the location or position of the controller 100. The location sensor 172 can be an absolute sensor that detects the absolute location of the controller 100, or it may be a relative sensor that detects the location of the controller 100 relative to other devices, or to a reference location (e.g., a displacement sensor that detects the change in position from a starting point). The location sensor 172 can include a tracking device or any device that that permits the measurement of position. The location sensor 172 can be linear, angular, or multi-axis. The location sensor can include, for instance, a capacitive transducer, a capacitive displacement sensor, an ultrasonic sensor, a proximity sensor, a laser sensor, a differential transformer, or other similar devices.

The motion sensor 174 detects and tracks the motion of the controller 100, and in some examples, it may detect and monitor the speed of the controller 100 and its acceleration/deceleration. The motion sensor 174 may be located remote from the controller 100, and take the form of a camera or other motion sensing equipment. In other aspects, the motion sensor 174 may be located within a controller housing 110 and monitor inertia and acceleration to monitor the motion of the device. For example, the motion sensor 174 may utilize tilt sensors, gyroscopes, accelerometers, or the like to determine motion. In some examples, the motion sensor 174 may include equipment located both within the controller housing 110 and outside of it. The motion sensor 174 may also combine information from cameras outside the controller housing 110 and accelerometers or other sensors located within it. The motion sensor, as with all of the sensors described herein, may consist of any combination of the other sensors of the controller 100. For example, the motion sensor may be a combination of the location sensor 172 and the orientation sensor 170.

The direction sensor 176 provides the controller with information as to the current direction of motion of the controller. The direction sensor 176 detects the direction in which the controller 100 is moving, if any. The direction sensor may include a compass and may also include or operate in connection with accelerometers, gyroscopes, and/or tilt sensors. In some embodiments, the direction sensor 176 may be an aggregate of various other sensors, including, for instance, the sensors described herein. For instance, the direction sensor may be a combination of the orientation sensor 170 and the motion sensor 174, or other combinations.

The controller may also include other sensors 180 that can be configured to provide other functions that provide information regarding the current operating conditions. For example, the other sensors 180 can include a clock or timer for monitoring the time of day, the length of time of a particular event (e.g., the length of time that the controller has been in a particular location or travelling in a particular direction), or the amount of time remaining until a predetermined event (e.g., the amount of time until the facility opens/closes, etc.). Other sensors 180 can also include speed and/or acceleration sensors, temperature sensors, pressure sensors, cameras, noise sensors, light sensors, and the like. The other sensors 180 may communicate or operate in connection with the various sensors of the controller 100, including the orientation sensor 170, the location sensor 172, the motion sensor 174, and/or the direction sensor 176.

The controller 100 of FIG. 3 also has a processing device 150, which can be one or more microprocessors, mircrocontrollers, or other central processing units capable of receiving input and generating output. The processing device 150 may be in operative communication with the various components of the controller, including, for instance, the memory device 120, the receiver 130, the transmitter 140, the user interface, and the various sensors. The processing device 150 is configured to receive input from a variety of sources and to select a particular barrier operator with which to communicate. That is, the processing device 150 receives information about the current operating conditions (e.g., location, direction, motion, speed, orientation, etc.) relating to the controller 100 and, based on this information about current operating conditions, identifies a particular barrier operator (or operators) among the multiple barrier operators in a facility with whom the controller 100 should communicate.

The processing device 150 may make the determination based on a number of factors. For example, the processing device 150 may make a determination to select a particular barrier operator associated with a specific zone or location when it is determined that the controller 100 (or other components of the controller) are located within that zone. In other examples, the processing device 150 may consider factors regarding the direction of motion or the orientation (i.e., the direction that the controller is facing) to select a particular barrier operator. For instance, where a controller 100 is determined to be in a location that is overlapped by multiple zones associated with multiple barrier operators, the processing device 150 may consider to which of the barrier operators associated with those overlapping zones the controller 100 appears to be headed based on the direction and/or orientation of the controller 100.

The processing device 150 can be configured to have a particular barrier operator selected at any given moment, by continually updating and revising the particular barrier operator based on changing operating conditions. If and when a user activates a function, for example, by generating a user input via the user interface 160, the controller 100 will then communicate according to protocols configured to effect operation of the particular barrier operator selected by the processing device 150 based on the present operating conditions of the controller 100. Alternatively, the particular barrier operator can be determined by the processing device 150 in response to receiving the user input. In either case, in response to the user interface 160 receiving a user input at a first location for the receiver 130 or controller 110 (e.g., a user presses a button on the controller 100 while in a first zone), the controller 100 will effect transmission of a command, via the transmitter 140. That command will be configured to effect a function of the particular movable barrier operator selected by the processing device 150 (e.g., the barrier operator associated with the first zone).

The command will have a feature that is unique to the select movable barrier operator so that other movable barrier operators that are not the particular operator selected by the processing device 150 will not respond to the command. The feature can include a particular signal or identifier along with the command, where that signal or identifier is unique to the particular barrier operator. For example, the feature can include an ID tag, a code, a name, number, title, or other identifier unique to the particular barrier operator (or group of barrier operators).

The processing device 150 can be configured to modify the selected particular barrier operator as the current operating conditions change or select the particular barrier operator based on current conditions in response to receipt of the user input. For instance, as the controller 100 moves from one location or zone in the facility to another, the processing device 150 may modify the selected particular barrier operator to one that corresponds to the new location. In this way, when the user interface 160 receives another user input at a second location or under different operating conditions from the previously generated input, the controller 100 will effect transmission of a second command. The second command will effect a function of a second movable barrier operator different from the first selected barrier operator based on the new operating conditions. The second command may have a feature (e.g., an ID tag, a code, a name, number, title, or other identifier) that is unique to the second select movable barrier operator so that other movable barrier operators receiving the command do not perform the function.

In some examples, the processing device 150 may make the determinations regarding the select particular barrier operator from within the controller housing 110. In other examples, the processing device 150 making the determination may be located external to the controller 100, and the information regarding the select barrier operator can be communicated to the controller via the receiver 130. In such an example, a processing unit within the controller 100 may only need to generate a particular feature (e.g., an identifier) that is associated with the particular barrier operator when the user interface 160 receives a user input. In this way, in response to receiving a user input, the controller 100 (via the transmitter 140) will generate a command with the feature or identifier to all the barrier operators (or to a facility operator 30). All barrier operators that are not associated with the particular feature or identifier can be configured to ignore the command, such that only the particular barrier operator responds to the command.

As discussed above, entering an input via the user interface 160 can cause the controller 100 to transmit a command to a particular barrier operator. In other examples, however, the controller 100 may be more simplified, and may only include scanning and advertising hardware, and may not include a processing device that associates commands with unique identifiers. In such an example, a user input may only transmit a signal to a stationary apparatus that acts as a proxy. The signal may only include the location information or information pertaining to other operating conditions but not include a command configured to directly effect a function by a barrier operator. In this manner, a proxy apparatus may be triggered to make the determination of the particular barrier operator and then to transmit a command with the proper feature or identifier to the barrier operators. This remote proxy apparatus, in combination with the controller 100, can form an apparatus for controlling multiple movable barriers in a common area or facility.

The processing device 150 may consider a variety of features to determine and select the particular barrier operator based on the present operating conditions. In some examples, the processing device 150 may select the particular barrier operator based on the location of the controller 100 alone. In other examples, the processing device may make a determination based on the direction of motion of the controller 100, the orientation of the controller 100, the speed of the controller 100, or any of the other factors monitored by the controller 100 and its components, and/or combinations thereof.

The processing device 150 can use a variety of techniques to determine the particular barrier operator based on current operating conditions. In some examples, the processing device 150 may execute various algorithms configured to process the current operating conditions and determine a particular barrier operator. In another example, the processing device 150 may consult a look-up table, which may be stored in the memory device 120, to make the determination. One example of a look-up table is presented below as Table 1.

TABLE 1 context mapping a user input to multiple barrier operators

| Source | Information | Mapping | Fixed, Roll, P/L, Payload | Door | Comments |
|---|---|---|---|---|---|
| BLE/Wi-Fi Aware Beacons | $Location_a$ $Location_b$ $Location_c$ | $Location_1 \rightarrow Zone_1$ $Location_2 \rightarrow Zone_2$ $Location_3 \rightarrow Zone_3$ | $F_1, R_1, P/L_1, Payload_1$ $F_2, R_2, P/L_2, Payload_2$ $F_7, R_7, P/L_7, Payload_7$ | 1 2 7 | Simple non overlapping zones |
| Compass | $Direction_1$ $Direction_2$ | $Location_2$ $\rightarrow Zone3, Zone4$ && $Direction_1 \rightarrow$ $Location_3$ && $Direction_2 \rightarrow$ | $F_3, R_3, P/L_3, Payload_3$ $F_4, R_4, P/L_4, Payload_4$ | 3 4 | Resolve which door user intends based on direction |
| Accelerometer | $Orientation_1$ $Orientation_2$ | $\rightarrow$ | | | Combine if necessary |
| Gyro | Gesture/Motion | $\rightarrow$ | $F_1, R_1, P/L_1, Payload_1$ | | |

Table 1 associates information obtained from various sources as to the present operating conditions of the controller 100 with particular barrier operators among multiple barrier operators at a facility. In particular, Table 1 associates current operating condition information with the particular barrier operators according to the facility map of FIG. 4. The facility of FIG. 4 includes 7 barrier operators, or doors, each associated with a particular zone. For example, barrier 1 (or door 1) is associated with zone 1, barrier 2 is associated with zone 2, and so on. Notably, the arrangement of the facility in FIG. 4 results in certain zones that overlap with one another. In this example, because barrier 4 is located along a side wall in an area between barriers 3 and 5, the zone associated with barrier 4 partially overlaps with the zones for barriers 3 and 5. Accordingly, in such a situation, it may not be possible to determine a particular barrier operator based on the location of a controller by itself.

Figure 4:
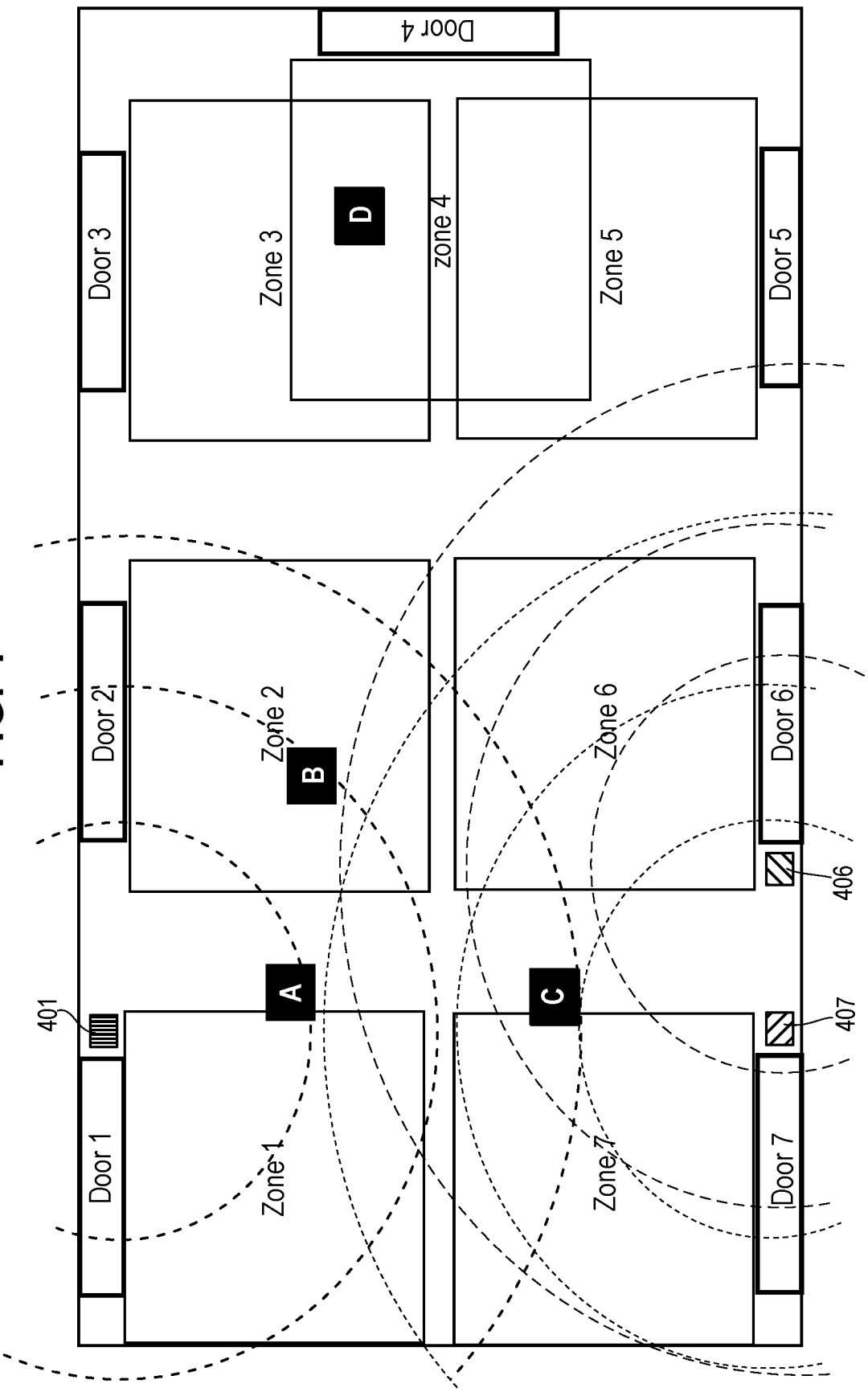
FIG. 4 is a plan view of an exemplary multi-barrier facility that includes multiple barrier operators associated with zones that overlap.

FIG. 4 shows three beacons installed in the area, although additional beacons can be used. Beacon 401 is associated with barrier operator 1, beacon 406 is associated with barrier operator 6, and beacon 407 is associated with barrier operator 7. Each beacon emits a beacon advertisement or signal so that a scanning transmitter on a controller can find its position using one or more beacons. With three beacons, an accurate location can be determined using independent measurements from each of the beacons, thereby triangulating the signal. In the embodiment of FIG. 4, the controller located in location B will be associated in zone 2, which means that if a user enters a user input on a controller from location 2, barrier operator 2 will be actuated.

Table 1 takes into account information provided from each of four various devices labeled A, B, C, and D (which devices can correspond to controllers, or vehicles possessing a controller), and uses that information to determine a particular barrier operator. For example, the table takes information obtained from location sensors (identified as BLE/Wi-Fi Aware beacons), direction sensors (identified as a compass), orientation sensors (identified as an accelerometer), and motion sensors (identified as Gyro). In some examples, the location sensors can be determined by triangulation (as described above), or by estimation. The beacons can be Bluetooth (BLE), Wi-Fi Aware beacons, or the like. In other examples, the location sensors may use GPS to determine the location.

The direction sensors referenced in Table 1 include a compass, which consider the direction that the controller is pointing or travelling. The orientation sensors include an accelerometer or tilt device that work with respect to the earth's gravity. The motion or gesture sensors include a 6-degree-of-freedom gyroscope in connection with an accelerometer.

Using the information regarding the operating conditions from the various sensors of each of the controllers A, B, C, and D, the processing device 150 accesses Table 1 to associate each of the controllers with a particular barrier operator. Based on the determined zone, the table assigns a particular code format to be used to effect an action by the particular barrier operator. In the example of Table 1, the code format includes features such as a particular fixed code portion (Fixed), a particular rolling code portion (Roll), a particular message format known as a payload type (P/L), and a particular payload sent with the message. Each barrier operator will only respond to commands received using its particular fixed code, rolling code, and payload type, any one or all of which differs from that used by the other barrier operators in the area. Because each barrier operator will only act in response to receiving a command using its particular combination of fixed code, rolling code, and payload type, this information from Table 1 is used by the processing device 150 to transmit a signal that will only activate the selected barrier operator. Other features that can distinguish a signal intended for a particular barrier operator can include a particular frequency or encryption scheme. The transmitted code can be sent at a variety of frequencies, such as a low band unidirectional transmission.

The processing device 150 refers to Table 1 with information pertaining to the location of controller A, which indicates that the controller is in or near zone 1. As this is a simple, non-overlapping zone, the table identifies the select barrier operator as barrier 1. For controller C, which is located in zone 7, the table identifies the select barrier operator as barrier 7, which is associated with zone 7. For controller B, located in zone 2, the table identifies the select barrier operator as barrier 2, associated with zone 2.

Table 1 accounts for further information regarding the controller D, as this controller is located in an area covered by overlapping zones. That is, controller D is located in a position that is equally within zone 3, associated with barrier 3, and zone 4, associated with barrier 4. Based on location alone, either barrier 3 or barrier 4 could be an appropriate selection, thus, the processing device 150 uses the table to consider other factors, in particular the direction, orientation, and motion of the controller to select a particular barrier operator. Where the direction of the controller is pointed toward door 3, the table associates the controller with barrier 3. Where the controller is detected as heading in the direction of door 4, the table associates the controller with barrier 4. Where the direction itself is ambiguous, other factors may be considered, such as the orientation of the controller, and/or the motion of the controller.

In the example of Table 1 and FIG. 4, the processing device 150 is configured to refer to Table 1 to consider location first and the direction second in determining which particular barrier operator to identify. In other situations, other algorithms or rules may be applied depending on the layout of the facility, the vehicle using the controller, and other factors. For instance, where a controller is assigned to a vehicle that makes long trips across the length of a facility (i.e., crossing over several zones), it may be more appropriate to consider the direction that the controller is pointed to first when selecting a particular barrier operator.

FIGS. 5A-D and 6A-D show examples situations of a fork lift operator with a controller in a facility with multiple barrier operators, and the logic applied by a processing device to determine what action to take when a user input is received by the user interface 160. In FIGS. 5A-D, the logic is based on a specific location determined, for instance, by a GPS-based system. In FIG. 5A, the fork lift operator possessing the controller is located near, but not in, the zone corresponding to barrier operator A. Because the controller is not detected to be within any zone, the processing device will take no action if a user enters a user input in this situation.

Conversely, in FIG. 5B, the fork lift operator and controller are located directly in the zone associated with barrier operator A. Thus, in this situation, the processing device transmits commands specifically configured to be received by barrier operator A. That is, the controller will transmit a command that may be heard by each of barrier operators A, B, and C, but because it is configured with features or identifiers specific to barrier operator A, barrier operators B and C will ignore the command.

Likewise, in FIG. 5C, the fork lift operator and controller are in the zone associated with barrier operator B. Accordingly, when a user enters an input via the user interface, the control logic of the processing device will transmit a command tailored to effect the operation of only barrier operator B and not barrier operators A and C. Similarly, in FIG. 5D, where the fork lift operator and controller are in the zone associated with barrier operator C, commands sent from the controller will be configured to effect operation of only barrier operator C.

Figure 6A:
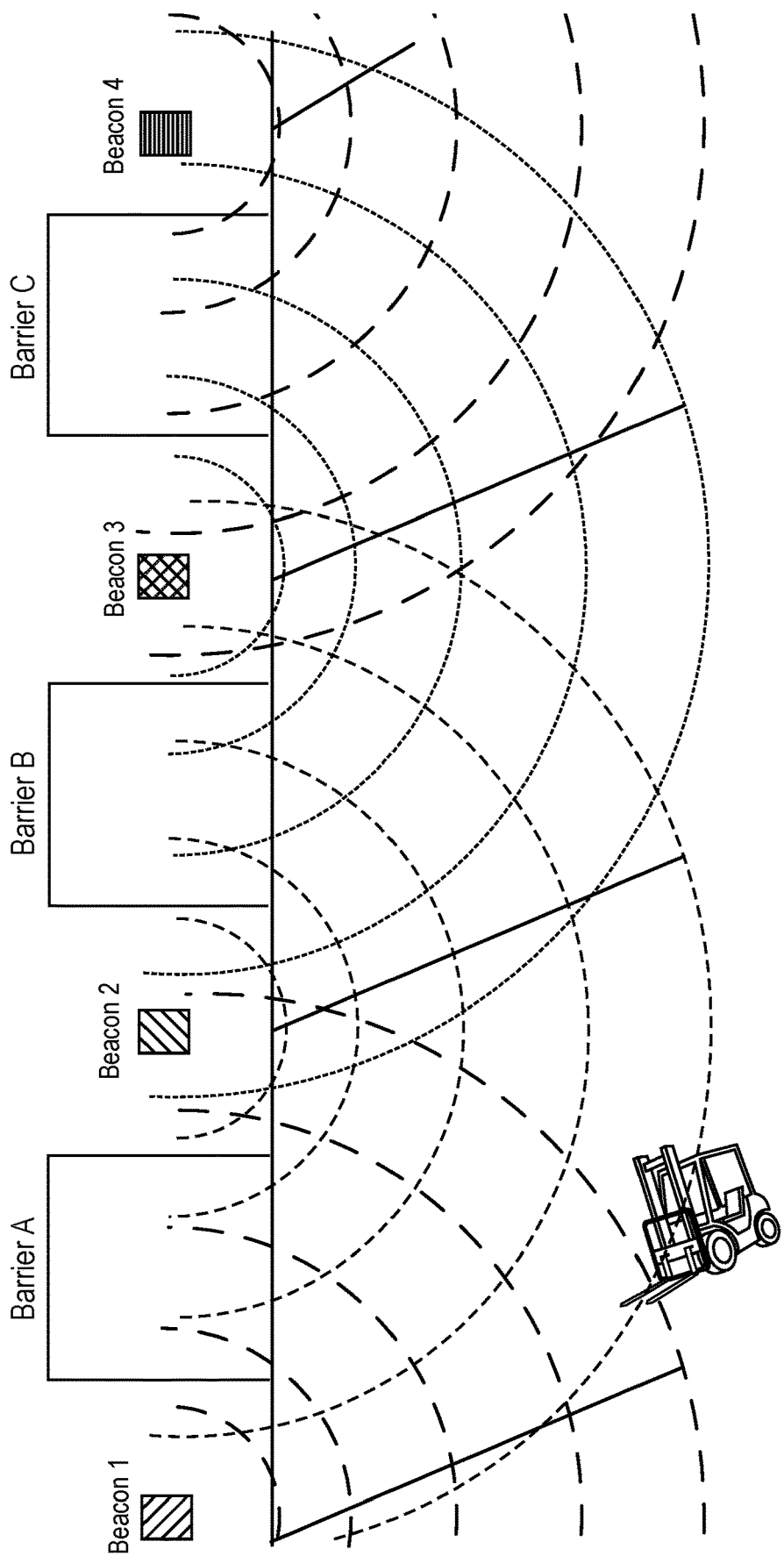
Figure 6B:
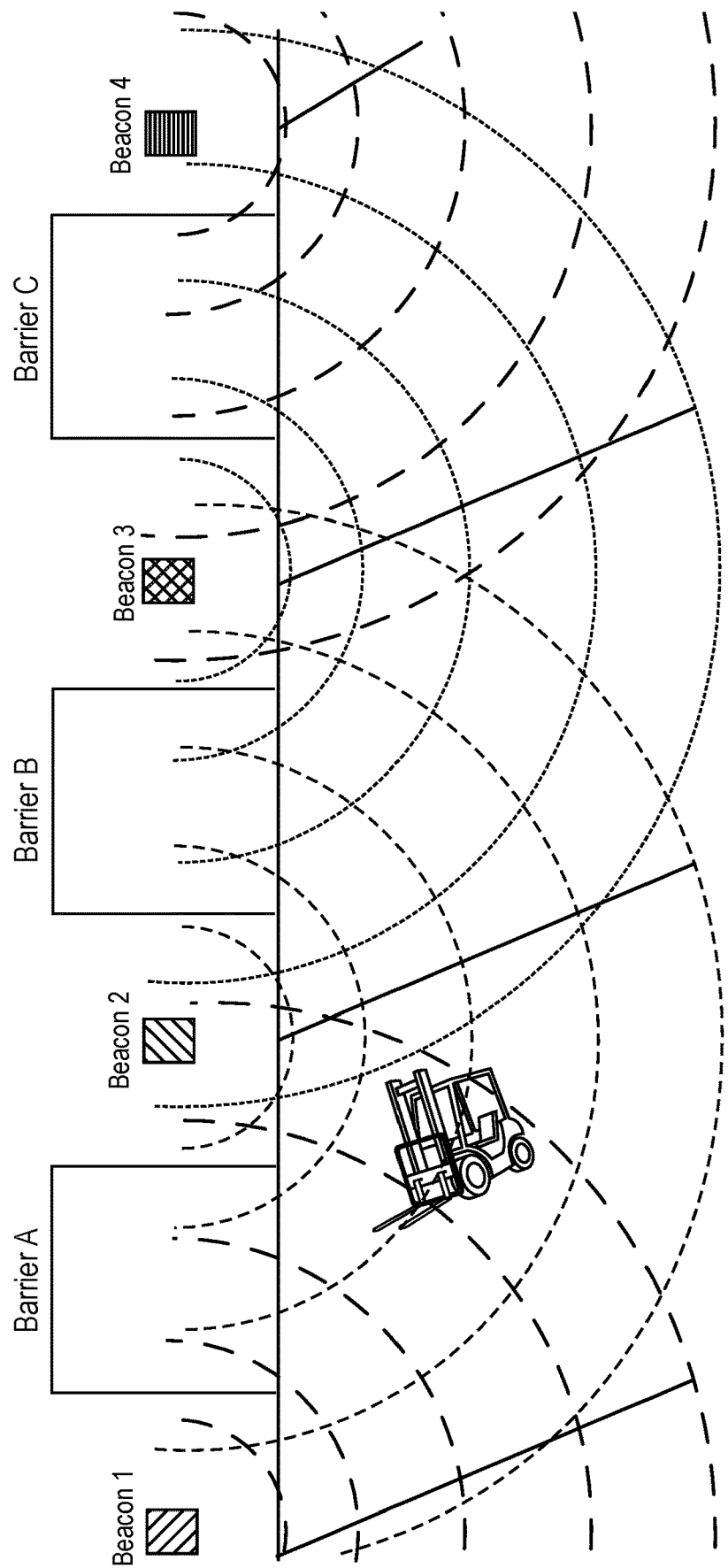
Figure 6C:
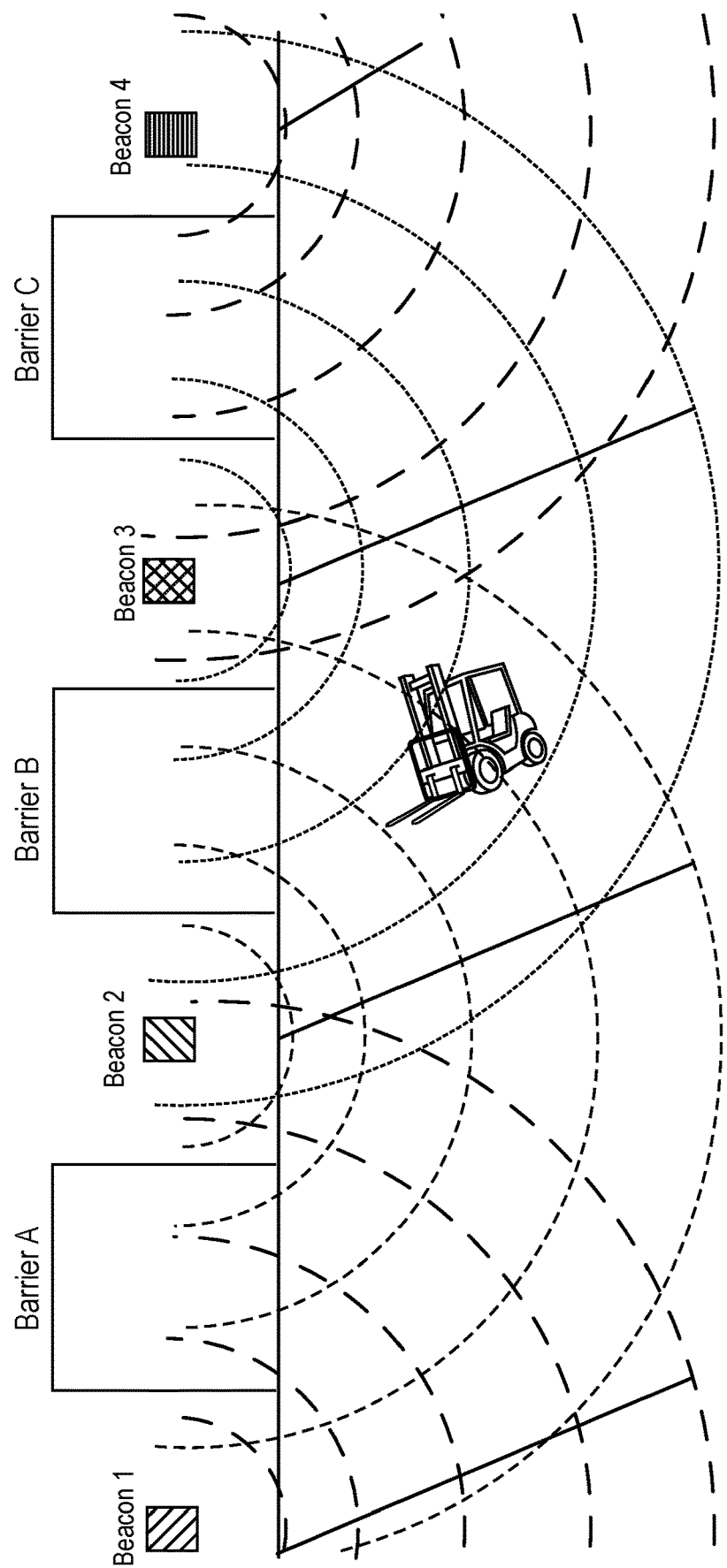

In FIGS. 6A-D, the illustrated situation is similar to that of FIGS. 5A-D, only the location of the fork lift is determined based on the triangulation of radio-based systems. In FIG. 6A, as with FIG. 5A, the fork lift and controller are not in a zone identified with any barrier operator, and thus a user input in the controller in this situation will not activate any function. In FIGS. 6B, 6C, and 6D, however, the fork lift operator and controller are located in the zones associated with barrier operators A, B, and C, respectively. Accordingly, in each situation, when a user enters an input via an interface, the processing device will transmit commands configured to be followed only by the barrier operator associated with the zone in which the controller is located, and the other operators will ignore it.

In the radio triangulation examples of FIGS. 6A-D, the strength of the radio signal can be used to determine the location (or the distance between barriers) as well as the direction (e.g., whether the truck is approaching or retreating from a given barrier) using known techniques. The identification beacons (shown in the figures as squares between the doors) can be located between barriers, as shown in FIGS. 6A-D, in the front of the barrier, or anywhere around the barrier or associated zone.

In some embodiments, the controller will be notified of which barrier operator is the currently selected particular barrier operator. That is, the controller may be notified as to which barrier operator will operate if the controller sends a command function at a given moment. The user interface of the controller may be able to display this information, for instance, by way of a display that identifies a particular barrier operator. Depending on the configuration of the user interface, this display could include an LED light system (e.g., certain lights represent certain barrier operators, certain colors represent certain barrier operators, etc.) or a graphical display that identifies the barrier operator by name, number, or direction. In some examples, the controller can be configured to allow a user to manually override the selected particular barrier operator by way of the user interface. For example, where a user sees on the interface that the particular barrier operator in a given instance will be barrier C, but would prefer to operate with barrier A, the user may be able to manually select barrier A, thereby overriding the automatically selected barrier.

FIG. 7 illustrates an example message sequence for determining a particular barrier operator to perform a function based on the detected location of a controller. A transceiver in the controller scans for information from beacons throughout the facility, receiving signals including identifying information for each beacon, wherein each received signal inherently has a particular signal strength. The controller (e.g., via a processing unit) uses the signal strengths associated with each received beacon transmission (associated with the particular beacon's identifying information, e.g., an RSSI number) to calculate a location of the controller. Based on this calculated location, the controller selects a particular barrier operator. In the first example of FIG. 7, it is determined that the controller is in zone 1, associated with barrier 1, and therefore CD01 (barrier operator 1) is selected as the particular barrier operator. Accordingly, in response to receiving a user input, a command is sent using features particular to barrier operator 1 such that only barrier operator 1 will operate. In the second example of FIG. 7, it is determined that the controller is in zone 2, associated with barrier 2, and therefore CD02 (barrier operator 2) is selected as the particular barrier operator.

In some examples, the beacons and/or barrier operators can be equipped with displays that provide feedback to users by way of LED lights or other indicators or displays. As the processing device gathers the information pertaining to the operating conditions and determines a selected particular barrier operator, the indicators on the beacons/barrier operators can provide feedback so that a user can see which barrier operator will perform the function if a user input is provided. For example, each of the barrier operators may have an LED light that displays red if it is currently unselected (i.e., will not respond to a command from the controller), and green if it is currently selected as the particular barrier operator. The beacons/barrier operators can be made aware of their status as a selected operator by way of the controller or other component publishing the select barrier operator (e.g., by broadcasting a particular barrier operator title, number, or other identifier via a wireless signal), and the beacons/barrier operators scanning for information about select barrier operator status.

Figure 8:
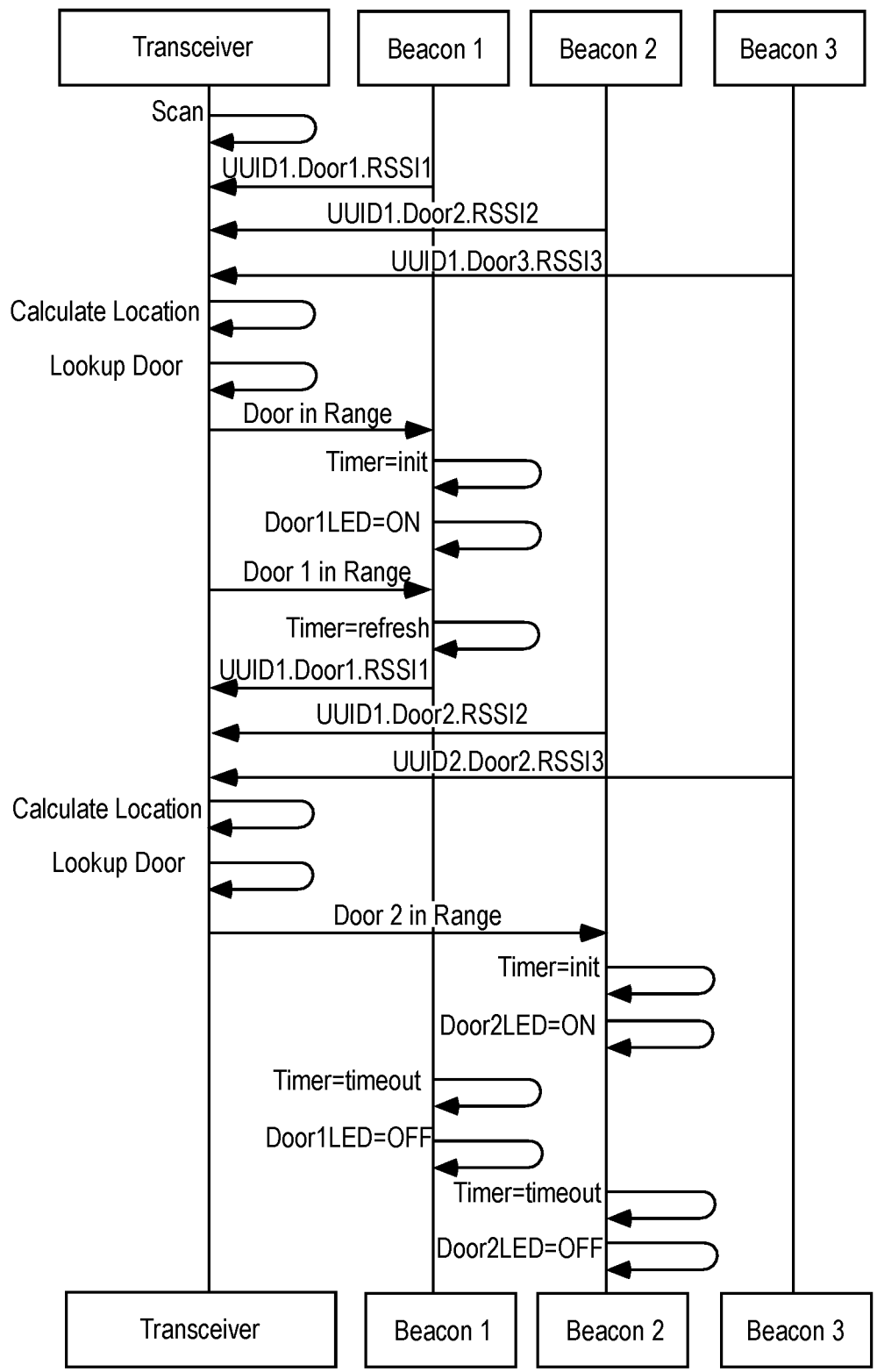
FIG. 8 is a diagram depicting an example message sequence for determining a particular barrier operator to perform a function based on a method that provides LED feedback in accordance aspects described in this application.

FIG. 8 shows the message sequence for determining a particular barrier operator to perform a function based on a method that provides LED feedback to a user. A transceiver in the controller scans for information from beacons throughout the facility. After receiving information from each of three beacons, the controller (e.g., via a processing unit) calculates a location of the controller as described above with respect to FIG. 7. Based on this calculated location, the controller determines a particular barrier operator (or door), and transmits a signal to the beacon associated with that barrier operator. That beacon then turns a display indicator on (thereby identifying itself as the currently selected barrier operator) and leaves that timer on for a predetermined amount of time. If the operating conditions are such that the barrier operator is still selected, the controller will effect sending another signal indicating that the barrier operator is still selected before the predetermined amount of time passes so that the indicator will remain on.

In the second example of FIG. 8, the transceiver scans three beacons for a position of the controller and calculates the location, selecting beacon 2 as associated with the selected particular barrier operator. The transmitter then publishes this information, which is received by beacon 1 and beacon 2. In response, beacon 1 turns off its indicator, and beacon 2 turns on its indicator, starting a timer. Following the end of the first time cycle, it is determined that beacon 2 is no longer the select barrier operator, and the indicators for both beacon 1 and beacon 2 are turned off. Alternatively, beacon 1 may not receive or understand the transmission intended for beacon 2 that beacon 2 is associated with the selected barrier operator, in which case beacon 1's indicator will turn off with expiration of its timer based on the predetermined amount of time.

Some embodiments of this application relate to a location aware action generation input, where location awareness is utilized to identify the action to be generated. The location can be determined utilizing global position, wherein the global position is accurate to less than two feet. Alternatively, the location awareness can be created using at least two transmitting devices, where at least one of the transmitting devices is a transmitter, and at least one is a transceiver. In some instances, the location can be detected utilizing the relative signal strength.

In some examples described herein, if the input device may have a default setting. For example, if a location cannot be determined, the input device may default to prompt a user to select a particular target for the command.

The input device can be configured to effect a variety of different functions when activated, including, selection of a particular door to activate, turning on a light, controlling a light, operating or selecting a dock leveler, operating or selecting a trailer lock, controlling a power outlet, and controlling a camera. In some examples, the effect of the user input can be modified or controlled by various operating conditions of the input device, including the orientation of a device. For instance, tilting the device and activating an input can effect a different function than if the input is generated while the device is flat. The input can also be controlled by modifying the direction of a device (e.g., pointing a device at a door can generate a different effect than pointing the device at the ground). In some examples, the selected action can be modified by the gestures of a device, such as by shaking or tilting the device.

The present application also describes methods for operating devices in facilities that include multiple devices. FIG. 9 is a flow diagram for one such method. In particular, FIG. 9 depicts an example method 900 of operating a movable barrier among multiple movable barriers in a facility or common area.

Method 900 involves receiving 910 information pertaining to present operating conditions relating to a controller. The receiving 910 information may involve transmitting a plurality of signals from a plurality of positioning devices. These signals may include information pertaining to the operating conditions of the controller. For example, these signals may include information pertaining to the location of the controller, or a receiver or other component of the controller. The information indicative of a location of the controller may be relative to multiple other barrier operators at the facility. The location information can be received from a plurality of positioning devices, each of the plurality of positioning devices comprising a transmitter. The location information can also be received from a global positioning system.

The receiving 910 may also include determining or receiving information pertaining to the orientation of the control apparatus, for instance, via an accelerometer, tilt sensor, or similar device. In some examples, the receiving 910 includes determining a direction of movement of the control apparatus, for example, using a compass or other directional detection device. The receiving 910 can also include determining a motion of the control apparatus. The motion can be determined from motion sensors located within the controller or external to it. Accordingly, the information pertaining to the operating conditions can include information pertaining to the location, direction, orientation, gesturing, speed, or acceleration of the controller. The information can also relate to the time of day or the time and/or duration of the occurrence of certain detected events. The information can be received by a receiver in the control apparatus, which receiver obtains the information from sources outside of the controller. Additionally, the information may come from sources located within the controller, such as from sensors and detectors within a controller housing.

The information pertaining to the operating conditions is then stored 920 in a memory, which memory can be located within the controller or external thereto. The information can be stored in the form of a look-up table or other database.

The controller receives 930 a user input via a user interface on the controller. The user input can include the press of a button, the toggling of a switch, the detection of a voice command, or the selection of an icon on a touch screen interface. The user input can be associated with a particular function of the target device. For example, the user input can be associated with the opening or closing of a movable barrier, turning on or off a light, operation of a camera, or a variety of other functionality.

In response to receiving the user input, a processing device associated with the controller determines 940 a first particular barrier operator or other device to perform the function associated with the user input. In some examples, the determining will involve consulting with the information pertaining to the operating conditions stored in the memory. For instance, a processing device may consult with the information in the memory to determine that the controller is located in a zone associated with a first barrier operator and thereby determine that the first barrier operator is the particular barrier operator that will be the target of the user input.

The controller, or a device associated with the controller, then transmits 950 a command for the first particular barrier operator. The command itself may be transmitted to all of the barrier operators or devices in the facility. However, the command may have a feature or other identifier associated with it such that only the particular barrier operator will respond to the command. The other barrier operators or devices in the facility are configured to ignore the command. In response, the first particular barrier operator then performs the function associated with the user input.

Method 900 continually performs steps 910 and 920 as the operating conditions change. In another location, or under different operating conditions, where the controller receives 930 a second user input, a different particular barrier operator may be identified as the selected barrier operator, and a second command is transmitted to the second barrier operator. In response, the second particular barrier operator then performs the function associated with the user input.

The presently described apparatuses, systems, and methods, allow a single controller device to operate a plurality of barriers, doors, and other functions within a single facility. This can be performed without requiring multiple inputs on the controller. In one form, only a single user input (i.e., one button) is needed to operate individual ones of several barrier operators within range of the controller. Further, because the described systems monitor the location of a controller among other features, it can also be detected when the controller leaves the facility. This can allow the controller to be de-activated once the controller leaves the premises of the facility, which can alleviate security concerns.

The presently described technology can be used in a variety of different facilities, including warehouses, shipping facilities, or even residential homes and garages. The technology can also be used across multiple facilities. For example, a controller can be programmed to operate various equipment located in each of a user's multiple homes, or homes of friends or family members. That is, a single controller could be configured to operate garage doors at a user's home, the user's vacation home, and at the home of the user's various family members. In this way, the controllers and systems, recognizing the location of the controller (e.g., via GPS), will understand which barrier operator should be operated based on the location and/or other operating conditions, and will transmit signals that effect the operation of the proper barrier operator without requiring the user to make a selection or to reprogram the controller.

The present technology allows users to operate intended barrier operators without having to read labels, select proper buttons, toggle between various interfaces, or point to a particular operator. This can be particularly beneficial, for instance, to forklift drivers in a warehouse or similar facility that are often occupied with performing many tasks, and who would expose themselves to safety risks when they take their eyes off those tasks to look at or operate a controller.

The present technology also takes a variety of operating conditions into consideration in addition to location. For instance, the present technology can be configured to utilize directions (e.g., by way of a compass), motion, speed, orientation (e.g., by way of tilt sensors) and other factors to help determine a particular barrier operator to select. This can be useful in situations where location itself is not necessarily determinate of a particularly desired barrier operator, for instance, where a user is in a location that is overlapped by zones associated with multiple barrier operators.

The present disclosure describes preferred embodiments and examples of the present a location aware barrier operator and related methods of use and operation. Those skilled in the art will recognize that a wide variety of modifications, alterations, and combinations can be made with respect to the embodiments described above without departing from the scope of the invention as set forth in the claims, and that such modifications, alterations, and combinations are to be viewed as being within the ambit of the inventive concept. In addition, it should also be understood that features of one embodiment described herein may be combined with features of other embodiments described herein to provide yet other embodiments as desired. All references cited in the present disclosure are hereby incorporated by reference in their entirety.

What is claimed is:

1. An apparatus for controlling multiple movable barriers in a common area, the apparatus comprising a control apparatus comprising:
    a memory device configured to store information corresponding to a plurality of movable barrier operators;
    a receiver configured to receive beacon signals, each beacon signal associated with a respective movable barrier operator of the plurality of movable barrier operators;
    a user interface configured to receive a user input;
    a transmitter; and
    a processing device in operative communication with the memory device, the receiver, the user interface, and the transmitter, the processing device configured to:
        determine a location of the receiver based at least in part on a comparison of the beacon signals;
        determine a select movable barrier operator of the plurality of movable barrier operators based at least in part on the receiver location;
        in response to the user interface receiving the user input at a first location for the receiver, effect transmission of a first radio frequency command to effect a function of the select movable barrier operator, the first radio frequency command having a feature that is unique to the select movable barrier operator so that another movable barrier operator of the plurality of movable barrier operators receiving the first radio frequency command does not perform the function; and
        in response to the user interface receiving the user input at a second location for the receiver different from the first location, effect transmission of a second radio frequency command to effect a function of a second select movable barrier operator based at least in part on the receiver location, the second radio frequency command having a feature that is unique to the second select movable barrier operator so that another movable barrier operator of the plurality of movable barrier operators receiving the second radio frequency command does not perform the function of the second select movable barrier operator.

2. The apparatus of claim 1, wherein the processing device is further configured to determine a location of the transmitter relative to individual ones of the plurality of movable barrier operators based at least in part on signal strengths of the beacon signals.

3. The apparatus of claim 1, further comprising:
    an orientation sensor configured to determine an orientation of the control apparatus;
    wherein the processing device is in operative communication with the orientation sensor and is further configured to determine the select movable barrier operator of the plurality of movable barrier operators based at least in part on the orientation of the control apparatus.

4. The apparatus of claim 1, further comprising:
    a direction sensor configured to determine a direction of movement of the control apparatus;
    wherein the processing device is in operative communication with the direction sensor and is further configured to determine the select movable barrier operator of the plurality of movable barrier operators based at least in part on the direction of movement of the control apparatus.

5. The apparatus of claim 1, further comprising:
a motion sensor configured to determine a motion of the control apparatus;
wherein the processing device is in operative communication with the motion sensor and is further configured to determine the select movable barrier operator of the plurality of movable barrier operators based at least in part on the motion of the control apparatus.

6. The apparatus of claim 1, wherein the memory device is configured to store the information corresponding to the plurality of movable barrier operators, the information including a plurality of commands, wherein the first radio frequency command to effect the function of the select movable barrier operator is selected from the plurality of commands, and wherein the selected command corresponds to the select movable barrier operator.

7. The apparatus of claim 1, further comprising a housing, wherein the receiver is substantially within the housing.

8. The apparatus of claim 7, wherein the processing device is substantially within the housing.

9. The apparatus of claim 7, wherein the processing device is external to the housing and remote from the receiver.

10. The apparatus of claim 7, wherein the transmitter is external to the housing and remote from the receiver.

11. The apparatus of claim 1, further comprising a display configured to display information pertaining to the select movable barrier.

12. The apparatus of claim 1, wherein the first radio frequency command to effect the function of the select movable barrier operator comprises a command to control at least one device associated with the select movable barrier operator, the at least one device selected from the group consisting of:
a movable barrier,
a photoeye,
a safety edge,
a light,
a lighting control,
a dock leveler,
a trailer lock,
a controlled power outlet,
a camera,
an edge guard,
a dock seal,
a dock bumper,
a microwave sensor,
an area optical detector, and
a loop detector.

13. The apparatus of claim 1, further comprising:
the plurality of movable barrier operators; and
the beacons associated with the plurality of movable barrier operators, each of the beacons comprising a beacon transmitter configured to transmit a signal;
wherein the receiver of the control apparatus is configured to receive the signals transmitted by the beacons associated with the plurality of movable barrier operators, the signals indicative of the receiver location.

14. The apparatus of claim 13, wherein at least one of the beacons further comprises a display configured to provide a visual indication of a status of the select movable barrier operator.

15. A method for operating a movable barrier among multiple movable barriers in a common area, the method comprising:
storing at a memory device information corresponding to a plurality of movable barrier operators;
receiving, at a receiver, beacon signals, each beacon signal associated with a respective movable barrier operator of the plurality of movable barrier operators;
receiving a user input at a user interface;
determining, with a processing device, a location of the receiver based at least in part on a comparison of the beacon signals;
determining, with the processing device, a select movable barrier operator of the plurality of movable barrier operators based at least in part on the location of the receiver;
transmitting a first radio frequency command to the select movable barrier operator to effect a function of the select movable barrier operator in response to the user interface receiving the user input at a first location of the receiver, the first radio frequency command having a feature that is unique to the select movable barrier operator so that another movable barrier operator of the plurality of movable barrier operators receiving the first radio frequency command does not perform the function; and
transmitting a second radio frequency command to a second select movable barrier operator to effect a function of the second select movable barrier operator in response to the user interface receiving the user input at a second location of the receiver different from the first location, the second radio frequency command having a feature that is unique to the second select movable barrier operator so that another movable barrier operator of the plurality of movable barrier operators receiving the second radio frequency command does not perform the function of the second select movable barrier operator.

16. The method of claim 15 further comprising:
transmitting the beacon signals from beacons each adjacent one of the plurality of movable barrier operators.

17. The method of claim 15, wherein a control apparatus includes the receiver and the method further comprises:
determining an orientation of the control apparatus;
wherein determining the select movable barrier operator of the plurality of movable barrier operators comprises determining the select movable barrier operator of the plurality of movable barrier operators based at least in part on the determined orientation of the receiver.

18. The method of claim 15, wherein a control apparatus includes the receiver and the method further comprises:
determining a direction of movement of the control apparatus;
wherein determining the select movable barrier operator of the plurality of movable barrier operators comprises determining the select movable barrier operator of the plurality of movable barrier operators based at least in part on the determined direction of movement of the receiver.

19. The method of claim 15, wherein a control apparatus includes the receiver and the method further comprises:
determining a motion of the control apparatus;
wherein determining the select movable barrier operator of the plurality of movable barrier operators comprises determining the select movable barrier operator of the plurality of movable barrier operators based at least in part on the determined motion of the receiver.

20. The method of claim 15, wherein the beacon signals are radio signals.

21. A non-transitory computer readable medium having computer readable instructions stored thereon, the instructions comprising:

instructions for receiving at a receiver beacon signals, each beacon signal associated with a respective movable barrier operator of the plurality of movable barriers operators;

instructions for determining, with a processing device, a location of the receiver based at least in part on a comparison of the beacon signals;

instructions for determining, with the processing device, a select movable barrier operator of the plurality of movable barrier operators based at least in part on the location of the receiver;

instructions for transmitting a first radio frequency command to the select movable barrier operator to effect a function of the select movable barrier operator in response to a user interface receiving a user input at a first location of the receiver, the first radio frequency command having a feature that is unique to the select movable barrier operator so that another movable barrier operator of the plurality of movable barrier operators receiving the first radio frequency command does not perform the function; and instructions for transmitting a second radio frequency command to a second select movable barrier operator to effect a function of the second select movable barrier operator in response to the user interface receiving the user input at a second location of the receiver different from the first location, the second radio frequency command having a feature that is unique to the second select movable barrier operator so that another movable barrier operator of the plurality of movable barrier operators receiving the second radio frequency command does not perform the function of the second select movable barrier operator.

22. The non-transitory computer-readable medium of claim 21, wherein a control apparatus includes the receiver, and the instructions further include:

instructions for determining at least one of an orientation, a direction of movement, and a motion of the control apparatus; and instructions for determining the select movable barrier operator of the plurality of movable barrier operators based at least in part on the determined at least one of the orientation, direction of movement, and motion of the control apparatus.

* * * * *